US011532988B2

(12) United States Patent
Sakai et al.

(10) Patent No.: US 11,532,988 B2
(45) Date of Patent: Dec. 20, 2022

(54) DAB CONVERTER

(71) Applicant: TDK CORPORATION, Tokyo (JP)

(72) Inventors: Tetsuya Sakai, Tokyo (JP); Taichi Iura, Tokyo (JP); Hiroshige Yanagi, Tokyo (JP); Kazuki Iwaya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 77 days.

(21) Appl. No.: 17/326,157

(22) Filed: May 20, 2021

(65) Prior Publication Data

US 2021/0367521 A1 Nov. 25, 2021

(30) Foreign Application Priority Data

May 25, 2020 (JP) .............................. JP2020-090354

(51) Int. Cl.
*H02M 3/335* (2006.01)
(52) U.S. Cl.
CPC ... *H02M 3/33573* (2021.05); *H02M 3/33584* (2013.01)
(58) Field of Classification Search
CPC ....................... H02M 3/33573; H02M 3/33584
See application file for complete search history.

(56) References Cited

U.S. PATENT DOCUMENTS

| 10,998,810 B2* | 5/2021 | Watanabe | H02M 3/33584 |
|---|---|---|---|
| 2012/0014138 A1* | 1/2012 | Ngo | H02M 3/33584 |
| | | | 363/17 |
| 2016/0156274 A1* | 6/2016 | Miura | H02M 3/1582 |
| | | | 363/17 |
| 2020/0021198 A1* | 1/2020 | Miyazaki | H02M 3/3376 |
| 2020/0186046 A1* | 6/2020 | Tanaka | H02M 1/32 |
| 2021/0159804 A1* | 5/2021 | Yamada | H02M 3/33573 |
| 2022/0158563 A1* | 5/2022 | Ishibashi | H02M 3/33573 |

FOREIGN PATENT DOCUMENTS

JP 2013-251998 A 12/2013

* cited by examiner

*Primary Examiner* — Jue Zhang
(74) *Attorney, Agent, or Firm* — Oliff PLC

(57) ABSTRACT

A DAB converter that is capable of inhibiting a decrease in the transmission efficiency of electric power due to an individual difference of the inductance. A DAB converter including: a transformer having a primary-side winding and a secondary-side winding; a first and second full bridge circuit; a first and second capacitor; and a control unit, in which, the primary and secondary side winding is connected between a midpoint and a midpoint of the first full bridge circuit, the first capacitor is connected between two input/output terminals included in the first full bridge circuit, the second capacitor is connected between two input/output terminals included in the second full bridge circuit, and the control unit configured to adjust a phase difference between the switching of the first and second full bridge circuit based on an estimated value of an inductance of the DAB converter.

21 Claims, 9 Drawing Sheets

DAB CONVERTER

BACKGROUND OF THE INVENTION

Field of the Invention

The present invention relates to a DAB converter.

Priority is claimed on Japanese Patent Application No. 2020-090354, filed May 25, 2020, the content of which is incorporated herein by reference.

Description of Related Art

Bidirectional isolated converters including two full bridge circuits together with a transformer, that is, DAB converters have been studied and developed.

In relation to this, a DAB converter that includes a transformer having a primary-side winding and a secondary-side winding and two full bridge circuits and inhibits a decrease in the transmission efficiency of electric power from the primary-side winding to the secondary-side winding by controlling switching of these two full bridge circuits is known (see Patent Document 1).

PATENT DOCUMENTS

[Patent Document 1] Japanese Unexamined Patent Application, First Publication No. 2013-251998

SUMMARY OF THE INVENTION

Here, a DAB converter as disclosed in Patent Document 1 has a combined inductance of an inductance of a first part including a primary-side winding and an inductance of a second part including a secondary-side winding as an inductance of the DAB converter. However, the inductances of DAB converters have large individual differences and frequently are inductances different from those of design values. As a result, there are cases in which it is unlikely that a decrease in transmission efficiency of electric power from the primary-side winding to the secondary-side winding in a DAB converter will be able to be inhibited.

The present invention is in view of such situations, and an object thereof is to provide a DAB converter in which decrease in the transmission efficiency of electric power due to individual differences in inductance is able to be inhibited.

According to one aspect of the present invention, there is provided a dual active bridge (DAB) converter including: a transformer having a primary-side winding and a secondary-side winding; a first full bridge circuit; a second full bridge circuit; a first capacitor; a second capacitor; and a control unit configured to control switching of the first full bridge circuit and switching of the second full bridge circuit, in which, the primary-side winding is connected between a 11th midpoint among two midpoints included in the first full bridge circuit and a 12th midpoint among the two midpoints included in the first full bridge circuit, the secondary-side winding is connected between a 21st midpoint among two midpoints included in the second full bridge circuit and a 22nd midpoint among the two midpoints included in the second full bridge circuit, the first capacitor is connected between two input/output terminals included in the first full bridge circuit, the second capacitor is connected between two input/output terminals included in the second full bridge circuit, and the control unit configured to adjust a phase difference between the switching of the first full bridge circuit and the switching of the second full bridge circuit based on an estimated value of an inductance of the DAB converter.

According to the present invention, a decrease in the transmission efficiency of electric power due to an individual difference of inductance can be inhibited.

DETAILED DESCRIPTION OF THE INVENTION

Embodiment

Figure 1:
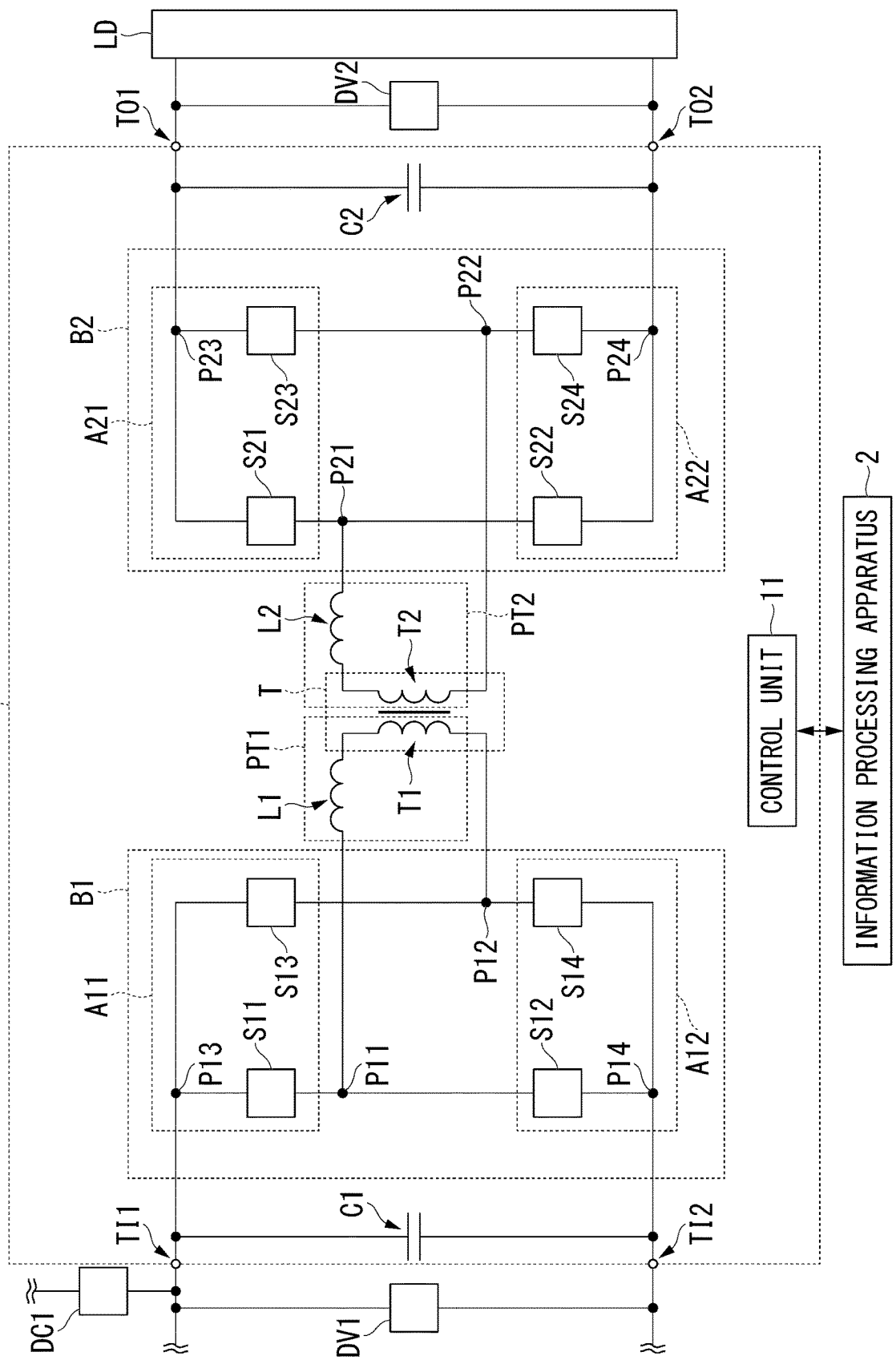
FIG. 1 is a diagram illustrating an example of the circuit configuration of a DAB converter 1 according to an embodiment.

Hereinafter, an embodiment of the present invention will be described with reference to the drawings. Here, in the embodiment, a conductor transmitting an electrical signal according to DC power or an electrical signal according to AC power will be referred to as a transmission line in the description. For example, the transmission line may be a conductor printed on a board, a conducting wire in which a conductor is formed in a linear shape, or any other conductor. In the embodiment, the term "voltage" represents an electric potential difference from an electric potential serving as a predetermined reference, and the electric potential serving as a reference will be omitted in the drawings and description. Here, the electric potential serving as a reference may be any electric potential. In the embodiment, a case in which the electric potential serving as a reference is a ground electric potential will be described as an example. In the embodiment, for the convenience of description, a state in which a drain terminal and a source terminal are conductive among states of a certain field effect transistor will be referred to as an on state in description. In addition, in the embodiment, for the convenience of description, a state in which the drain terminal and the source terminal are not conductive among the states of a certain field effect transistor will be referred to as an off state in description.

<Overview of DAB Converter>

First, an overview of a DAB converter according to the embodiment will be described. The DAB converter includes a transformer having a primary-side winding and a secondary-side winding, a first full bridge circuit, a first inductor, a second full bridge circuit, a first capacitor, a second capacitor, and a control unit. Here, the primary-side winding is connected between a 11th midpoint among two midpoints included in the first full bridge circuit and a 12th midpoint among the two midpoints included in the first full bridge circuit. In addition, the secondary-side winding is connected between a 21st midpoint among two midpoints included in the second full bridge circuit and a 22nd midpoint among the two midpoints included in the second full bridge circuit. The first capacitor is connected between two input/output terminals included in the first full bridge circuit. In addition, the second capacitor is connected between two input/output terminals included in the second full bridge circuit. The control unit controls switching of the first full bridge circuit and switching of the second full bridge circuit. More specifically, the control unit adjusts a phase difference between the switching of the first full bridge circuit and the switching of the second full bridge circuit based on an estimation value of the inductance of the DAB converter.

In accordance with this, the DAB converter according to the embodiment can inhibit a decrease in the transmission efficiency of electric power due to an individual difference of the inductance. Hereinafter, a circuit configuration of the DAB converter and an operation of the DAB converter will be described in detail.

<Circuit Configuration of DAB Converter>

Hereinafter, the circuit configuration of a DAB converter 1 according to the embodiment will be described with reference to FIG. 1. FIG. 1 is a diagram illustrating an example of the circuit configuration of the DAB converter 1 according to the embodiment.

The DAB converter 1 is an example of the DAB converter described above. The DAB converter 1 is a bidirectional isolated converter.

The DAB converter 1 includes a transformer T, a first full bridge circuit B1, a first inductor L1, a first capacitor C1, a second full bridge circuit B2, a second inductor L2, a second capacitor C2, two input/output terminals TI, two input/output terminals TO, and a control unit 11. In the example illustrated in FIG. 1, the DAB converter 1 is connected to an information processing apparatus 2. The DAB converter 1 may be configured not to include at least one of the first inductor L1 and the second inductor L2. Hereinafter, for the convenience of description, one of the two input/output terminals TI will be referred to as an input/output terminal TI1, and the other of the two input/output terminals TI will be referred to as an input/output terminal TI2 in description. In addition, for the convenience of description, one of the two input/output terminals TO will be referred to as an input/output terminal TO1, and the other of the two input/output terminals TO will be referred to as an input/output terminal TO2 in description. In FIG. 1, in order to prevent complications of drawings, transmission lines connecting the control unit 11 and the other circuits in the DAB converter 1 are not illustrated.

Here, as described above, the DAB converter 1 is a bidirectional isolated converter. For this reason, in a case in which a DC power supply is connected, the two input/output terminals TI function as input terminals of the DAB converter 1. On the other hand, in a case in which a load is connected, the two input/output terminals TI function as output terminals of the DAB converter 1. In a case in which a DC power supply is connected, the two input/output terminals TO function as input terminals of the DAB converter 1. On the other hand, in a case in which a load is connected, the two input/output terminals TO function as output terminals of the DAB converter 1.

The transformer T has a primary-side winding T1 and a secondary-side winding T2.

The first full bridge circuit B1 is an H bridge circuit that includes four switching elements S1. Hereinafter, for the convenience of description, these four switching elements S1 will be respectively referred to as a switching element S11, a switching element S12, a switching element S13, and a switching element S14 in description. In addition, hereinafter, for the convenience of description, as illustrated in FIG. 1, one of two midpoints included in the first full bridge circuit B1 will be referred to as a midpoint P11, and the other of the two midpoints included in the first full bridge circuit B1 will be referred to as a midpoint P12 in description. In the example illustrated in FIG. 1, the midpoint P11 is a connection point between the switching element S11 and the switching element S12. In this example, the midpoint P12 is a connection point between the switching element S13 and the switching element S14.

The switching element S1 may be any switching element such as a field effect transistor, a bipolar transistor, or a relay switch as long as it is a switching element that is switchable in accordance with control from the control unit 11. Hereinafter, a case in which the switching element S1 is a field effect transistor will be described as an example.

In the first full bridge circuit B1 illustrated in FIG. 1, the switching element S11 and the switching element S13 configure an upper arm A11 of the first full bridge circuit B1. Hereinafter, for the convenience of description, a connection point between the switching element S11 and the switching element S13 will be referred to as an input/output terminal P13 in description. The input/output terminal P13 is one of two input/output terminals included in the first full bridge circuit B1. Here, in a case in which a DC power supply is connected to the two input/output terminals TI, the input/output terminal P13 functions as one of two input terminals included in the first full bridge circuit B1. On the other hand, in a case in which a load is connected to the two input/output terminals TI, the input/output terminal P13 functions as one of two output terminals included in the first full bridge circuit B1.

In the first full bridge circuit B1 illustrated in FIG. 1, the switching element S12 and the switching element S14 configure a lower arm A12 of the first full bridge circuit B1. Hereinafter, for the convenience of description, a connection point between the switching element S12 and the switching element S14 will be referred to as an input/output terminal P14 in description. The input/output terminal P14 is the other of the two input/output terminals included in the first full bridge circuit B1. Here, in a case in which a DC power supply is connected to the two input/output terminals TI, the input/output terminal P14 functions as the other of the two input terminals included in the first full bridge circuit B1. On the other hand, in a case in which a load is connected to the two input/output terminals TI, the input/output terminal P14 functions as the other of the two output terminals included in the first full bridge circuit B1.

Such a first full bridge circuit B1 is connected in parallel to the first capacitor C1 between the input/output terminal TI1 and the input/output terminal TI2. In the example illustrated in FIG. 1, one of two terminals included in the first capacitor C1 and the input/output terminal P13 described above are connected to the input/output terminal TI1. In addition, in this example, the other of the two terminals included in the first capacitor C1 and the input/output terminal P14 described above are connected to the input/output terminal TI2. Another circuit element may be configured to be connected in series or in parallel between the first capacitor C1 and the input/output terminal TI1. In addition, another circuit element may be configured to be connected in series or in parallel between the input/output terminal P13 and the input/output terminal TI1. Another circuit element may be configured to be connected in series or in parallel between the first capacitor C1 and the input/output terminal TI2. In addition, another circuit element may be configured to be connected in series or in parallel between the input/output terminal P14 and the input/output terminal TI2.

The second full bridge circuit B2 is an H bridge circuit that includes four switching elements S2. Hereinafter, for the convenience of description, these four switching elements S2 will be respectively referred to as a switching element 821, a switching element S22, a switching element S23, and a switching element S24 in description. Hereinafter, for the convenience of description, as illustrated in FIG. 1, one of two midpoints included in the second full bridge circuit B2 will be referred to as a midpoint P21, and the other of the two midpoints included in the second full bridge circuit B2 will be referred to as a midpoint P22 in description. In the example illustrated in FIG. 1, the midpoint P21 is a connection point between the switching element S21 and the switching element S22. In addition, in this example, the midpoint P22 is a connection point between the switching element S23 and the switching element S24.

The switching element S2 may be any switching element such as a field effect transistor, a bipolar transistor, or a relay switch as long as it is a switching element that is switchable in accordance with control from the control unit 11. Hereinafter, a case in which the switching element S2 is a field effect transistor will be described as an example.

In the second full bridge circuit B2 illustrated in FIG. 1, the switching element S21 and the switching element S23 configure an upper arm A21 of the second full bridge circuit B2. Hereinafter, for the convenience of description, a connection point between the switching element S21 and the switching element S23 will be referred to as an input/output terminal P23 in description. The input/output terminal P23 is one of two input/output terminals included in the second full bridge circuit B2. Here, in a case in which a DC power supply is connected to the two input/output terminals TO, the input/output terminal P23 functions as one of two input terminals included in the second full bridge circuit B2. On the other hand, in a case in which a load is connected to the two input/output terminals TO, the input/output terminal P23 functions as one of two output terminals included in the second full bridge circuit B2.

In the second full bridge circuit B2 illustrated in FIG. 1, the switching element S22 and the switching element S24 configure a lower arm A22 of the second full bridge circuit B2. Hereinafter, for the convenience of description, a connection point between the switching element S22 and the switching element S24 will be referred to as an input/output terminal P24 in description. The input/output terminal P24 is the other of the two input/output terminals included in the second full bridge circuit B2. Here, in a case in which a DC power supply is connected to the two input/output terminals TO, the input/output terminal P24 functions as the other of the two input terminals included in the second full bridge circuit B2. On the other hand, in a case in which a load is connected to the two input/output terminals TO, the input/output terminal P24 functions as the other of the two output terminals included in the second full bridge circuit B2.

Such a second full bridge circuit B2 is connected in parallel with the second capacitor C2 between the input/output terminal TOT and the input/output terminal TO2. In the example illustrated in FIG. 1, one of two terminals included in the second capacitor C2 and the input/output terminal P23 described above are connected to the input/output terminal TOT. In addition, in this example, the other of the two terminals included in the second capacitor C2 and the input/output terminal P24 described above are connected to the input/output terminal TO2. Another circuit element may be configured to be connected in series or in parallel between the second capacitor C2 and the input/output terminal TO1. In addition, another circuit element may be configured to be connected in series or in parallel between the input/output terminal P23 and the input/output terminal TO1. Another circuit element may be configured to be connected in series or in parallel between the second capacitor C2 and the input/output terminal TO2. In addition, another circuit element may be configured to be connected in series or in parallel between the input/output terminal P24 and the input/output terminal TO2.

Here, an inductance of the DAB converter 1 is a combined inductance of an inductance of a primary-side circuit of the DAB converter 1 and an inductance of a secondary-side circuit of the DAB converter 1.

For example, the inductance of the primary-side circuit of the DAB converter 1 is represented by an inductance of a part, which is connected between the midpoint P11 and the midpoint P12, of the primary-side circuit of the DAB converter 1. Hereinafter, for the convenience of description, this part will be referred to as a first part PT1 in description. The inductance of the primary-side circuit of the DAB converter 1 may be configured to be represented by an inductance of a part other than the first part PT1 in the primary-side circuit of the DAB converter 1 together with the inductance of the first part PT1.

In the example illustrated in FIG. 1, the first inductor L1 and the primary-side winding T1 are connected in series between the midpoint P11 and the midpoint P12. In other words, in this example, the first part PT1 includes the first inductor L1 and the primary-side winding T1 connected in series with the first inductor L1. For this reason, in this example, the inductance of the first part PTT is a combined inductance of the inductance of the first inductor L1 and a leakage inductance of the primary-side winding T1. Another circuit element such as a capacitor may be connected in series or in parallel between the midpoint P11 and the midpoint P12 together with the first inductor L1 and the primary-side winding T1. In a case in which the DAB converter 1 does not include the first inductor L1, the primary-side winding T1 rather than the first inductor L1 is included in the first part PT1. In such a case, the inductance of the first part PT1 is a leakage inductance of the primary-side winding T1.

In the DAB converter 1, by performing winding such that a conductor gap between a winding start and a winding end of a conductor wound as the primary-side winding T1 does not become too small, the leakage inductance of the primary-side winding T1 is increased, and thus the primary-side winding T1 can be caused to function in place of the first inductor L1. On the other hand, in a case in which the DAB converter 1 includes the first inductor L1, it is preferable to perform winding such that a conductor gap between a winding start and a winding end of a conductor wound as the primary-side winding T1 is small in the DAB converter 1.

For example, the first inductor L1 is a choke coil. The first inductor L1 may be another circuit element, another member, or the like as long as it is a circuit element, a member, or the like having the same role as a choke coil.

The inductance of the secondary-side circuit of the DAB converter 1 is, for example, represented by an inductance of a part, which is connected between the midpoint P21 and the midpoint P22, of the secondary-side circuit of the DAB converter 1. Hereinafter, for the convenience of description, this part will be referred to as a second part PT2 in description. The inductance of the secondary-side circuit of the DAB converter 1 may be configured to be represented by an inductance of a part other than the second part PT2 in the secondary-side circuit of the DAB converter 1 together with the inductance of the second part PT2.

In the example illustrated in FIG. 1, the second inductor L2 and the secondary-side winding T2 are connected in series between the midpoint P21 and the midpoint P22. In other words, in this example, the second part PT2 includes the second inductor L2 and the secondary-side winding T2 connected in series with the second inductor L2. For this reason, in this example, the inductance of the second part PT2 is a combined inductance of the inductance of the second inductor L2 and a leakage inductance of the secondary-side winding T2. Another circuit element such as a capacitor may be connected in series or in parallel between the midpoint P21 and the midpoint P22 together with the second inductor L2 and the secondary-side winding T2. In a case in which the DAB converter 1 does not include the second inductor L2, not the second inductor L2 but the secondary-side winding T2 is included in the second part PT2. In such a case, the inductance of the second part PT2 is a leakage inductance of the secondary-side winding T2.

In the DAB converter 1, by performing winding such that a conductor gap between a winding start and a winding end of a conductor wound as the secondary-side winding T2 does not become too small, the leakage inductance of the secondary-side winding T2 is increased, and thus the secondary-side winding T2 can be caused to function in place of the second inductor L2. On the other hand, in a case in which the DAB converter 1 includes the second inductor L2, it is preferable to perform winding such that a conductor gap between a winding start and a winding end of a conductor wound as the secondary-side winding T2 is small in the DAB converter 1.

For example, the second inductor L2 is a choke coil. The second inductor L2 may be another circuit element, another member, or the like as long as it is a circuit element, a member, or the like having the same role as the choke coil.

Here, in the example illustrated in FIG. 1, a DC power supply that is not illustrated is connected to the input/output terminal TI1 and the input/output terminal TI2 of the DAB converter 1. A load is connected to the input/output terminal TO1 and the input/output terminal TO2 of the DAB converter 1. In the example illustrated in FIG. 1, as an example of such a load, a load LD is connected to the DAB converter 1. The load LD may be any load as long as it is the load connectable to the DAB converter 1. For example, the load LD may be a storage battery. In other words, in the example illustrated in FIG. 1, the DAB converter 1 supplies electric power supplied from a DC power supply connected to the DAB converter 1 to the load LD.

However, the inductance of the DAB converter 1 has large individual differences and thus, frequently, there are often large deviations therein. For this reason, the transmission efficiency of electric power according to the DAB converter 1 may be lowered by an amount of the deviation of the inductance of the DAB converter 1 from a design value when there is no adjustment.

Thus, the control unit 11 adjusts a phase difference between the switching of the first full bridge circuit B1 and the switching of the second full bridge circuit B2 based on an estimation value of the inductance of the DAB converter 1. In accordance with this, the DAB converter 1 can inhibit a decrease in the transmission efficiency of electric power due to an individual difference of inductance.

In this embodiment, the switching of the first full bridge circuit B1 is switching of each of four switching elements S1 included in the first full bridge circuit B1. In addition, in this embodiment, the switching of the second full bridge circuit B2 is switching of each of four switching elements S2 included in the second full bridge circuit B2. In this embodiment, a phase difference between the switching of the first full bridge circuit B1 and the switching of the second full bridge circuit B2 represents four phase differences including a first phase difference to a fourth phase difference described below.

The first phase difference is a phase difference between the switching of the switching element S11 and the switching of the switching element S21. More specifically, the first phase difference is a phase deviation between a square wave input to a gate terminal of the switching element S11 and a square wave input to a gate terminal of the switching element S21. When the DAB converter 1 is normally used, a square wave is input from the control unit 11 to the gate terminal of the switching element S11. In other words, when the DAB converter 1 is normally used, by inputting a square wave to the gate terminal of the switching element 811, the control unit 11 periodically changes the state of the switching element S11 between an on state and an off state in accordance with elapse of a time. In addition, when the DAB converter 1 is normally used, by inputting a square wave to the gate terminal of the switching element S21, the control unit 11 periodically changes the state of the switching element S21 between the on state and the off state in accordance with elapse of a time. In other words, a phase difference between these two square waves represents a phase difference between the switching of the switching element S11 and the switching of the switching element S21.

The second phase difference is a phase difference between the switching of the switching element S12 and the switching of the switching element S22. More specifically, the second phase difference is a phase deviation between a square wave input to a gate terminal of the switching element S12 and a square wave input to a gate terminal of the switching element S22. When the DAB converter 1 is normally used, a square wave is input from the control unit 11 to the gate terminal of the switching element S12. In other words, when the DAB converter 1 is normally used, by inputting a square wave to the gate terminal of the switching element S12, the control unit 11 periodically changes the state of the switching element S12 between an on state and an off state in accordance with elapse of a time. In addition, when the DAB converter 1 is normally used, by inputting a square wave to the gate terminal of the switching element S22, the control unit 11 periodically changes the state of the switching element S22 between the on state and the off state in accordance with elapse of a time. In other words, a phase difference between these two square waves represents a phase difference between the switching of the switching element S12 and the switching of the switching element S22.

The third phase difference is a phase difference between the switching of the switching element S13 and the switching of the switching element S23. More specifically, the third phase difference is a phase deviation between a square wave input to a gate terminal of the switching element S13 and a square wave input to a gate terminal of the switching element S23. When the DAB converter 1 is normally used, a square wave is input from the control unit 11 to the gate terminal of the switching element S13. In other words, when the DAB converter 1 is normally used, by inputting a square wave to the gate terminal of the switching element S13, the control unit 11 periodically changes the state of the switching element S13 between the on state and the off state in accordance with elapse of a time. In addition, when the DAB converter 1 is normally used, by inputting a square wave to the gate terminal of the switching element S23, the control unit 11 periodically changes the state of the switching element S23 between the on state and the off state in accordance with elapse of a time. In other words, a phase difference between these two square waves represents a phase difference between the switching of the switching element S13 and the switching of the switching element S23.

The fourth phase difference is a phase difference between the switching of the switching element S14 and the switching of the switching element S24. More specifically, the fourth phase difference is a phase deviation between a square wave input to a gate terminal of the switching element S14 and a square wave input to a gate terminal of the switching element S24. When the DAB converter 1 is normally used, a square wave is input from the control unit 11 to the gate terminal of the switching element S14. In other words, when the DAB converter 1 is normally used, by inputting a square wave to the gate terminal of the switching element S14, the control unit 11 periodically changes the state of the switching element S14 between an on state and an off state in accordance with elapse of a time. In addition, when the DAB converter 1 is normally used, by inputting a square wave to the gate terminal of the switching element S24, the control unit 11 periodically changes the state of the switching element S24 between the on state and the off state in accordance with elapse of a time. In other words, a phase difference between these two square waves represents a phase difference between the switching of the switching element S14 and the switching of the switching element S24.

In this embodiment, adjustment of the phase difference between the switching of the first full bridge circuit B1 and the switching of the second full bridge circuit B2 represents changing of at least one of four phase differences including the first phase difference to the fourth phase difference.

Hereinafter, for the convenience of description, an estimation value of the inductance of the DAB converter 1 will simply be referred to as an estimation value. Hereinafter, for the convenience of description, a phase difference between the switching of the first full bridge circuit B1 and the switching of the second full bridge circuit B2 will simply be referred to as a phase difference.

The control unit 11 adjusts the phase difference based on an estimation value estimated by the information processing apparatus 2 to be described later. The control unit 11 may be configured to estimate an estimation value and adjust the phase difference based on the estimation value that has been estimated.

The information processing apparatus 2, for example, is a portable PC (Personal Computer), a tablet PC, a desktop PC, a workstation, a multi-function portable telephone terminal (smartphone), a mobile telephone terminal, a PDA (Personal Digital Assistant), or the like and is not limited thereto.

The information processing apparatus 2, as described above, estimates an estimation value. More specifically, for example, the information processing apparatus 2 estimates an estimation value based on an input voltage for the DAB converter 1, an input current for the DAB converter 1, and an output voltage from the DAB converter 1. For this reason, a voltage detecting unit that detects an input voltage for the DAB converter 1, a current detecting unit that detects an input current for the DAB converter 1, and a voltage detecting unit that detects an output voltage from the DAB converter 1 are mounted in the DAB converter 1. In the example illustrated in FIG. 1, a first voltage detecting unit DV1, a first current detecting unit DC1, and a second voltage detecting unit DV2 are mounted in the DAB converter 1.

The first voltage detecting unit DV1 is a voltmeter. The first voltage detecting unit DV1 is mounted in the DAB converter 1 to be able to detect a voltage applied between the two input/output terminals T1 included in the DAB converter 1. More specifically, the first voltage detecting unit DV1 is mounted in the DAB converter 1 to be able to detect a voltage applied between the two input/output terminals (in other words, the input/output terminal P13 and the input/output terminal P14) included in the first full bridge circuit B1. In addition, the first voltage detecting unit DV1 is mounted in the DAB converter 1 to be able to communicate with the information processing apparatus 2. In the example illustrated in FIG. 1, the first voltage detecting unit DV1 is connected between two transmission lines connecting a power supply terminal of a DC power supply that is not illustrated and two input/output terminals (in other words, the input/output terminal TI1 and the input/output terminal T12) included in the DAB converter 1. In accordance with this, the first voltage detecting unit DV1 can detect a voltage applied between the two input/output terminals included in the first full bridge circuit B1. Hereinafter, for the convenience of description, the voltage detected by the first voltage detecting unit DV1 will be referred to as a first voltage in description. The first voltage detecting unit DV1 outputs first voltage information representing the detected first voltage to the information processing apparatus 2.

The first current detecting unit DC1 is an ammeter. The first current detecting unit DC1 is mounted in the DAB converter 1 to be able to detect a current flowing through the input/output terminal TI1 connected to a positive electrode-side power supply terminal of the DC power supply among the two input/output terminals TI included in the DAB converter 1. More specifically, the first current detecting unit DC1 is mounted in the DAB converter 1 to be able to detect a current flowing through the input/output terminal P13 connected to the input/output terminal TI1 among the two input/output terminals (in other words, the input/output terminal P13 and the input/output terminal P14) included in the first full bridge circuit B1. In addition, the first current detecting unit DC1 is mounted in the DAB converter 1 to be able to communicate with the information processing apparatus 2. In the example illustrated in FIG. 1, the first current detecting unit DC1 is connected to a transmission line that connects a power supply terminal of a DC power supply that is not illustrated and the input/output terminal TI1. In accordance with this, the first current detecting unit DC1 can detect a current flowing through an input/output terminal, which is disposed on a side to which a current is supplied from a DC power supply, among the two input/output terminals included in the first full bridge circuit B1. Hereinafter, for the convenience of description, this current detected by the first current detecting unit DC1 will be referred to as a first current in description. The first current detecting unit DC1 outputs first current information representing the detected first current to the information processing apparatus 2.

The second voltage detecting unit DV2 is a voltmeter. The second voltage detecting unit DV2 is mounted in the DAB converter 1 to be able to detect a voltage applied between the two input/output terminals TO included in the DAB converter 1. More specifically, the second voltage detecting unit DV2 is mounted in the DAB converter 1 to be able to detect a voltage applied between the two input/output terminals (in other words, the input/output terminal P23 and the input/output terminal P24) included in the second full bridge circuit B2. In addition, the second voltage detecting unit DV2 is mounted in the DAB converter 1 to be able to communicate with the information processing apparatus 2. In the example illustrated in FIG. 1, the second voltage detecting unit DV2 is connected between two transmission lines connecting a load and two input/output terminals (in other words, the input/output terminal TO1 and the input/output terminal TO2) included in the DAB converter 1. In accordance with this, the second voltage detecting unit DV2 can detect a voltage applied between the two input/output terminals included in the second full bridge circuit B2. Hereinafter, for the convenience of description, the voltage detected by the second voltage detecting unit DV2 will be referred to as a second voltage in description. The second voltage detecting unit DV2 outputs second voltage information representing the detected second voltage to the information processing apparatus 2.

The information processing apparatus 2 estimates an estimation value based on the first voltage detected by the first voltage detecting unit DV1, the first current detected by the first current detecting unit DC1, and the second voltage detected by the second voltage detecting unit DV2. More specifically, the information processing apparatus 2 calculates an estimation value using the first voltage, the first current, the second voltage and Equation (1) represented below.

$$P = \frac{V1\frac{N1}{N2}V2}{\omega L}\delta\left(1 - \frac{\delta}{\pi}\right) \quad (1)$$

Here, P represented in Equation (1) described above represents electric power supplied from a DC power supply to the DAB converter 1. V1 represented in Equation (1) described above represents a first voltage. V2 represented in Equation (1) described above represents a second voltage. N1 represented in Equation (1) described above represents the number of turns of primary-side winding T1. N2 represented in Equation (1) described above represents the number of turns of secondary-side winding T2. ω represented in Equation (1) described above represents an angular frequency of switching of the first full bridge circuit B1 and switching of the second full bridge circuit B2. δ represented in Equation (1) described above represents a phase difference. L represented in Equation (1) described above represents an inductance of the DAB converter 1. Among such parameters, known parameters in the information processing apparatus 2 are the primary-side winding T1, the secondary-side winding T2, the angular frequency ω, and the phase difference δ.

For example, the information processing apparatus 2 calculates electric power P based on the first voltage V1 and the first current. The information processing apparatus 2 estimates (calculates) a value of a combined inductance L based on the calculated electric power P, the first voltage V1, the second voltage V2, the primary-side winding T1, the secondary-side winding T2, the angular frequency co, and the phase difference δ as the estimation value described above.

Figure 2:
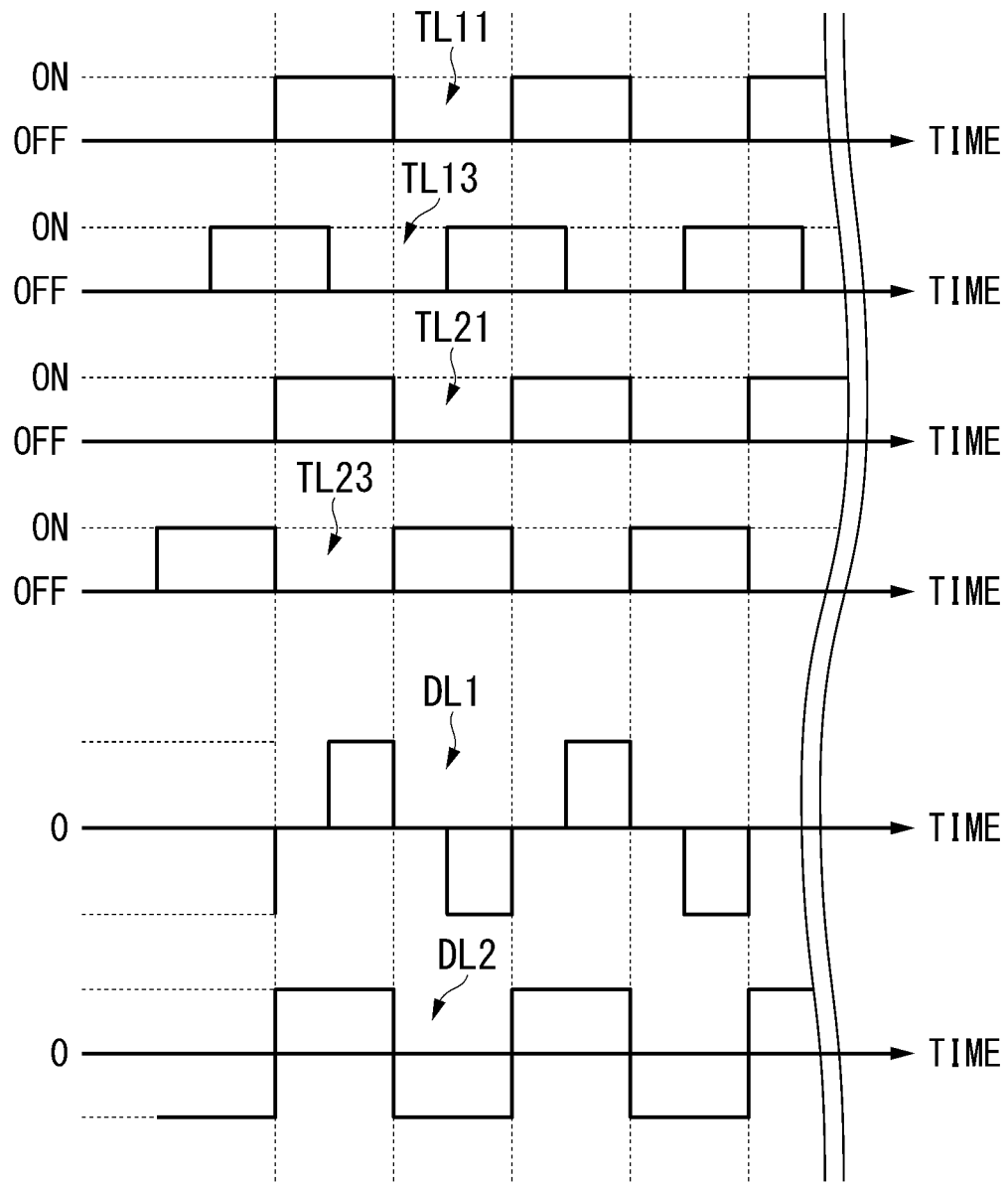
FIG. 2 is a diagram illustrating an example of a phase difference after adjustment performed by a control unit 11 in a case in which an estimated value is larger than a design value.

After the estimation value is estimated, the information processing apparatus 2 outputs estimation value information representing the estimated estimation value to the control unit 11 of the DAB converter 1. Then, the control unit 11 adjusts a phase difference based on the estimation value represented by the acquired estimation value information. For example, in a case in which the estimated estimation value is larger than a design value (that is, an inductance determined in advance), the control unit 11, for example, adjusts the phase difference to a phase difference as illustrated in FIG. 2. FIG. 2 is a diagram illustrating an example of a phase difference after adjustment performed by the control unit 11 in a case in which an estimation value is larger than a design value.

A graph TL11 illustrated in FIG. 2 is a diagram that illustrates an example of changes of the state of the switching element S11 over time. In the graph TL11, a period in which the state of the switching element S11 is the on state is represented by a period in which a displacement of a square wave represented in the graph TL11 coincides with "ON". In addition, in the graph TL11, a period in which the state of the switching element S11 is the off state is represented by a period in which a displacement of the square wave represented in the graph TL11 coincides with "OFF". A square wave representing changes of the state of the switching element S12 over time is a square wave of which a phase is shifted by $2\pi$ from that of the square wave representing changes of the state of the switching element S11 over time, and thus, illustration thereof is omitted.

A graph TL13 illustrated in FIG. 2 is a diagram that illustrates an example of changes of the state of the switching element S13 over time. In the graph TL13, a period in which the state of the switching element S13 is the on state is represented by a period in which a displacement of a square wave represented in the graph TL13 coincides with "ON". In addition, in the graph TL13, a period in which the state of the switching element S13 is the off state is represented by a period in which a displacement of the square wave represented in the graph TL13 coincides with "OFF". A square wave representing changes of the state of the switching element S14 over time is a square wave of which a phase is shifted by $2\pi$ from that of the square wave representing changes of the state of the switching element S13 over time, and thus, illustration thereof is omitted.

A graph TL21 illustrated in FIG. 2 is a diagram that illustrates an example of changes of the state of the switching element S21 over time. In the graph TL21, a period in which the state of the switching element S21 is the on state is represented by a period in which a displacement of a square wave represented in the graph TL21 coincides with "ON". In addition, in the graph TL21, a period in which the state of the switching element S21 is the off state is represented by a period in which a displacement of the square wave represented in the graph TL21 coincides with "OFF". A square wave representing changes of the state of the switching element S22 over time is a square wave of which a phase is shifted by $2\pi$ from that of the square wave representing changes of the state of the switching element S21 over time, and thus, illustration thereof is omitted.

A graph TL23 illustrated in FIG. 2 is a diagram that illustrates an example of changes of the state of the switching element S23 over time. In the graph TL23, a period in which the state of the switching element S23 is the on state is represented by a period in which a displacement of a square wave represented in the graph TL23 coincides with "ON". In addition, in the graph TL23, a period in which the state of the switching element S23 is the off state is represented by a period in which a displacement of the square wave represented in the graph TL23 coincides with "OFF". A square wave representing changes of the state of the switching element S24 over time is a square wave of which a phase is shifted by $2\pi$ from that of the square wave representing changes of the state of the switching element S23 over time, and thus, illustration thereof is omitted.

As illustrated in FIG. 2, in a case in which the estimation value is larger than a design value, the control unit 11 sets the first phase difference and the second phase difference to zero. In addition, in a case in which the estimation value is larger than the design value, the control unit 11 sets the third phase difference and the fourth phase difference to non-zero values. The magnitude of the non-zero values depends on the circuit configuration of the DAB converter 1. For this reason, in this embodiment, representation of a specific value as an example of the non-zero values is omitted.

Here, a graph DL1 illustrates an example of changes of a voltage applied to both ends of the first part PT1 over time in a case in which the third phase difference and the fourth phase difference are changed to non-zero values as illustrated in FIG. 2. In other words, the graph DL1 illustrates an example of changes of a voltage applied between the input/output terminal P13 and the input/output terminal P14 over time. In addition, a graph DL2 illustrates an example of changes of a voltage applied to both ends of the second part PT2 over time in that case. In other words, the graph DL2 illustrates an example of changes of a voltage applied between the input/output terminal P23 and the input/output terminal P24 over time.

In other words, in a case in which the estimation value is larger than the design value, for example, as illustrated in the graph DL1 and the graph DL2, the control unit 11 sets a time width with which a voltage is applied to both ends of the first part PT1 to be shorter than a time width with which a voltage is applied to both ends of the second part PT2. In other words, in this case, by adjusting the first phase difference and the second phase difference, the control unit 11 adjusts a phase difference between the phase of the square wave representing changes of the voltage applied to both ends of the first part PT1 over time and the phase of the square wave representing changes of the voltage applied to both ends of the second part PT2 over time. In accordance with this, in the circuit configuration of the DAB converter 1 illustrated in FIG. 1, the control unit 11 can inhibit a decrease in the transmission efficiency of electric power.

Figure 3:
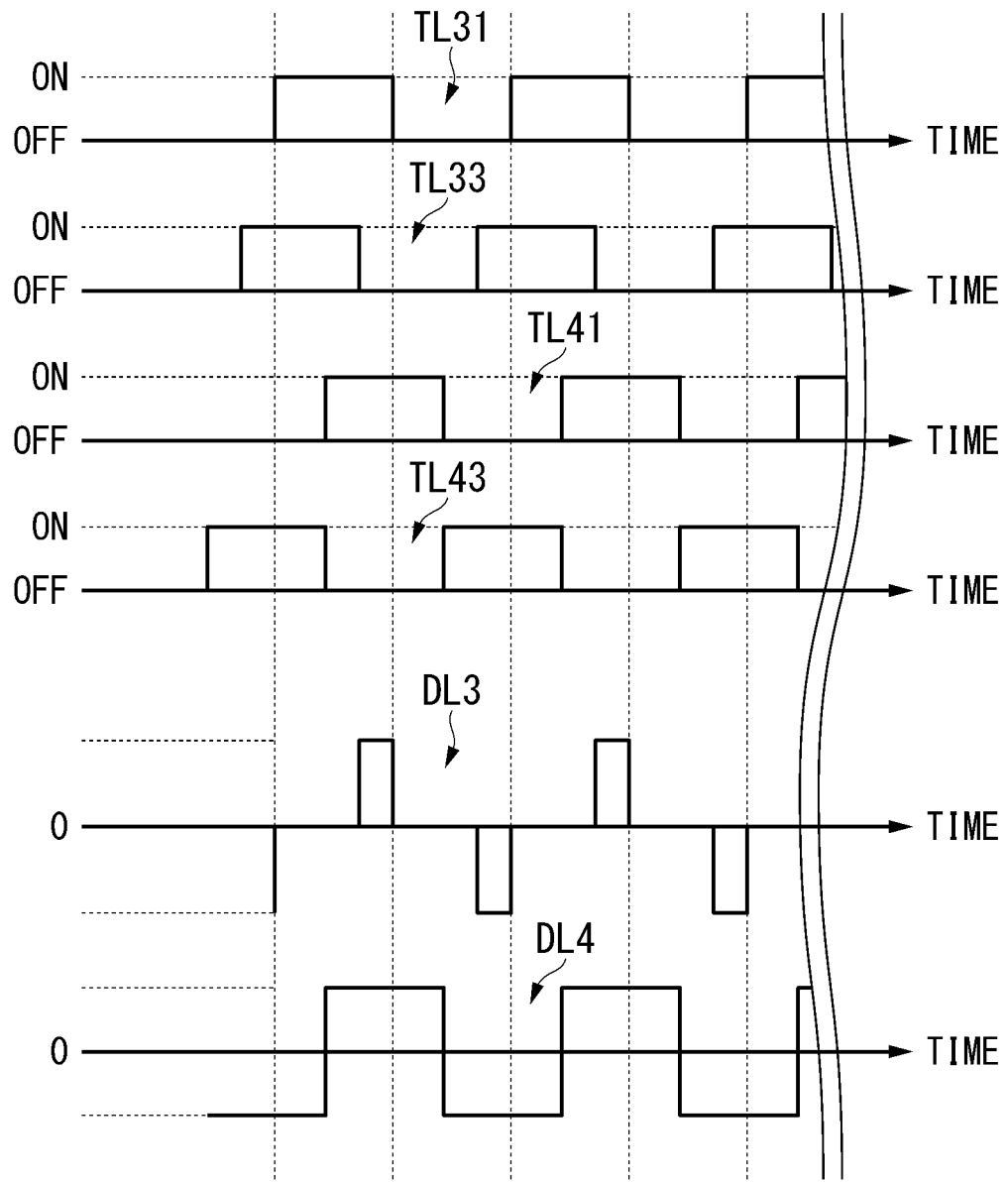
FIG. 3 is a diagram illustrating an example of a phase difference after adjustment performed by the control unit 11 in a case in which an estimation value is smaller than a design value.

On the other hand, for example, in a case in which the estimated estimation value is smaller than the design value (that is, an inductance determined in advance), the control unit 11, for example, adjusts the phase difference to a phase difference as illustrated in FIG. 3. FIG. 3 is a diagram illustrating an example of a phase difference after adjustment performed by the control unit 11 in a case in which an estimation value is smaller than a design value.

A graph TL31 illustrated in FIG. 3 is a diagram that illustrates another example of changes of the state of the switching element S11 over time. In the graph TL31, a period in which the state of the switching element S11 is the on state is represented by a period in which a displacement of a square wave represented in the graph TL31 coincides with "ON". In addition, in the graph TL31, a period in which the state of the switching element S11 is the off state is represented by a period in which a displacement of the square wave represented in the graph TL31 coincides with "OFF". A square wave representing changes of the state of the switching element S12 over time is a square wave of which a phase is shifted by $2\pi$ from that of the square wave representing changes of the state of the switching element S11 over time, and thus, illustration thereof is omitted.

A graph TL33 illustrated in FIG. 3 is a diagram that illustrates another example of changes of the state of the switching element S13 over time. In the graph TL33, a period in which the state of the switching element S13 is the on state is represented by a period in which a displacement of a square wave represented in the graph TL33 coincides with "ON". In addition, in the graph TL33, a period in which the state of the switching element S13 is the off state is represented by a period in which a displacement of the square wave represented in the graph TL33 coincides with "OFF". A square wave representing changes of the state of the switching element S14 over time is a square wave of which a phase is shifted by $2\pi$ from that of the square wave representing changes of the state of the switching element S13 over time, and thus, illustration thereof is omitted.

A graph TL41 illustrated in FIG. 3 is a diagram that illustrates another example of changes of the state of the switching element S21 over time. In the graph TL41, a period in which the state of the switching element S21 is the on state is represented by a period in which a displacement of a square wave represented in the graph TL41 coincides with "ON". In addition, in the graph TL41, a period in which the state of the switching element S21 is the off state is represented by a period in which a displacement of the square wave represented in the graph TL41 coincides with "OFF". A square wave representing changes of the state of the switching element S22 over time is a square wave of which a phase is shifted by $2\pi$ from that of the square wave representing changes of the state of the switching element S21 over time, and thus, illustration thereof is omitted.

A graph TL43 illustrated in FIG. 3 is a diagram that illustrates another example of changes of the state of the switching element S23 over time. In the graph TL43, a period in which the state of the switching element S23 is the on state is represented by a period in which a displacement of a square wave represented in the graph TL43 coincides with "ON". In addition, in the graph TL43, a period in which the state of the switching element S23 is the off state is represented by a period in which a displacement of the square wave represented in the graph TL43 coincides with "OFF". A square wave representing changes of the state of the switching element S24 over time is a square wave of which a phase is shifted by $2\pi$ from that of the square wave representing changes of the state of the switching element S23 over time, and thus, illustration thereof is omitted.

In the example illustrated in FIG. 3, in a case in which an estimation value is smaller than a design value, the control unit 11 changes the first phase difference and the second phase difference to non-zero values. In this example, the control unit 11 changes the third phase difference and the fourth phase difference to non-zero values in that case. In other words, in this example, in the case, the control unit 11 changes each of the first phase difference to the fourth phase difference to a non-zero value. The magnitudes of these four non-zero values depend on the circuit configuration of the DAB converter 1. For this reason, in this embodiment, representation of specific values as examples of these four non-zero values will be omitted.

Here, a graph DL3 illustrates an example of changes of a voltage applied to both ends of the first part PT1 over time in a case in which each of the first to fourth phase differences is changed to a non-zero value as illustrated in FIG. 3. In other words, the graph DL3 illustrates an example of changes of a voltage applied between the input/output terminal P13 and the input/output terminal P14 over time. In addition, a graph DL4 illustrates an example of changes of a voltage applied to both ends of the second part PT2 over time in that case. In other words, the graph DL4 illustrates an example of changes of a voltage applied between the input/output terminal P23 and the input/output terminal P24 over time.

In other words, in a case in which the estimation value is smaller than the design value, for example, as illustrated in the graph DL3 and the graph DL4, the control unit 11 sets a time width with which a voltage is applied to both ends of the first part PT1 to be shorter than a time width with which a voltage is applied to both ends of the second part PT2. In other words, in this case, by adjusting the first phase difference and the second phase difference, the control unit 11 adjusts a phase difference between the phase of the square wave representing changes of the voltage applied to both ends of the first part PT1 over time and the phase of the square wave representing changes of the voltage applied to both ends of the second part PT2 over time. In accordance with this, in the circuit configuration of the DAB converter 1 illustrated in FIG. 1, the control unit 11 can inhibit a decrease in the transmission efficiency of electric power.

The method of adjusting a phase difference using the control unit 11 illustrated in FIGS. 2 and 3 may be another method that is known or a method to be developed from now in place of the method described above. For this reason, in this embodiment, a further detailed description of the method of adjusting a phase difference using the control unit 11 will be omitted.

In addition, the information processing apparatus 2 may have a configuration for estimating an estimation value based on the first voltage, the second voltage, and a second current in place of the configuration for estimating an estimation value based on the first voltage, the first current, and the second voltage or in addition to the configuration for estimating an estimation value based on the first voltage, the first current, and the second voltage. The second current is a current that is detected by the second current detecting unit DC2 illustrated in FIG. 4.

Figure 4:
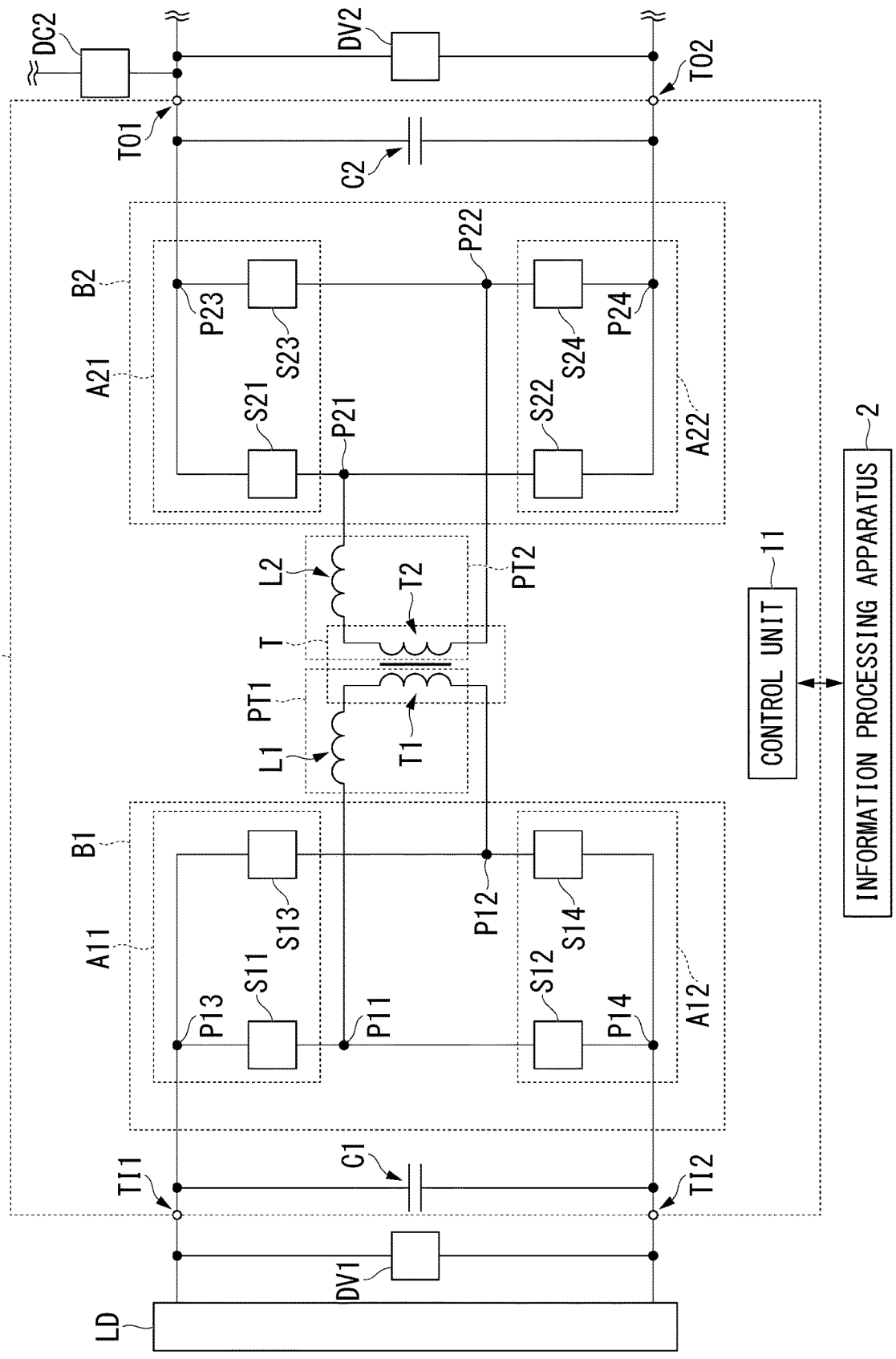
FIG. 4 is a diagram illustrating an example of the configuration of the DAB converter 1 in which a second current detecting unit DC2 is mounted in place of a first current detecting unit DC1.

FIG. 4 is a diagram illustrating an example of the configuration of the DAB converter 1 in which the second current detecting unit DC2 is mounted in place of the first current detecting unit DC1.

In the example illustrated in FIG. 4, a load LD is connected to two input/output terminals T1 included in the DAB converter 1. In this example, a DC power supply that is not illustrated is connected to two input/output terminals TO included in the DAB converter 1. In other words, in the DAB converter 1 illustrated in FIG. 4, an input/output relationship of the DAB converter 1 is interchanged from that of the DAB converter 1 illustrated in FIG. 1.

The second current detecting unit DC2 is an ammeter. The second current detecting unit DC2 is mounted in the DAB converter 1 to be able to detect a current flowing through the input/output terminal TO1 connected to a positive electrode-side power supply terminal of the DC power supply out of the two input/output terminals TO included in the DAB converter 1. More specifically, the second current detecting unit DC2 is mounted in the DAB converter 1 to be able to detect a current flowing from the input/output terminal P23 connected to the input/output terminal TO1 out of the two input/output terminals (in other words, the input/output terminal P23 and the input/output terminal P24) included in the second full bridge circuit B2 to the load LD. In addition, the second current detecting unit DC2 is mounted in the DAB converter 1 to be able to communicate with the information processing apparatus 2. In the example illustrated in FIG. 1, the second current detecting unit DC2 is connected to a transmission line that connects a positive electrode-side power supply terminal of the load LD and the input/output terminal TO1. In accordance with this, the second current detecting unit DC2 can detect a current flowing from the positive electrode-side input/output terminal out of the two input/output terminals included in the second full bridge circuit B2 to the load LD. The second current detecting unit DC2 outputs second current information representing the detected second current to the information processing apparatus 2.

In a case in which the second current detecting unit DC2 is mounted in the DAB converter 1, the information processing apparatus 2, for example, estimates an estimation value based on the following Equation (2).

$$P = \frac{V2\frac{N2}{N1}V1}{\omega L}\delta\left(1 - \frac{\delta}{\pi}\right) \quad (2)$$

Also in this case, the information processing apparatus 2 can estimate an estimation value. Then, the control unit 11 can adjust the phase difference based on the estimation value represented by the estimation value information acquired from the information processing apparatus 2. As a result, in the circuit configuration of the DAB converter 1 illustrated in FIG. 4, the control unit 11 can inhibit a decrease in the power efficiency of electric power.

As described above, the control unit 11 may be configured to estimate an estimation value in place of the information processing apparatus 2. In such a case, at least a part of the functions described above among the functions of the information processing apparatus 2 can be included in the control unit 11. For this reason, in that case, the information processing apparatus 2 may be configured not to be connected to the DAB converter 1. In addition, in that case, the first voltage detecting unit DV1 is mounted in the DAB converter 1 to be able to communicate with the control unit 11. In that case, the first current detecting unit DC1 is mounted in the DAB converter 1 to be able to communicate with the control unit 11. In that case, the second voltage detecting unit DV2 is mounted in the DAB converter 1 to be able to communicate with the control unit 11.

The first voltage detecting unit DV1 may be configured to be built into the DAB converter 1 instead of being configured to be externally attached to the DAB converter 1. In addition, the first current detecting unit DC1 may be configured to be built into the DAB converter 1 instead of being configured to be externally attached to the DAB converter 1. The second voltage detecting unit DV2 may be configured to be built into the DAB converter 1 instead of being configured to be externally attached to the DAB converter 1.

<Process of Estimating Estimation Value Using Information Processing Apparatus and Process of Adjusting Phase Difference Using Control Unit>

Figure 5:
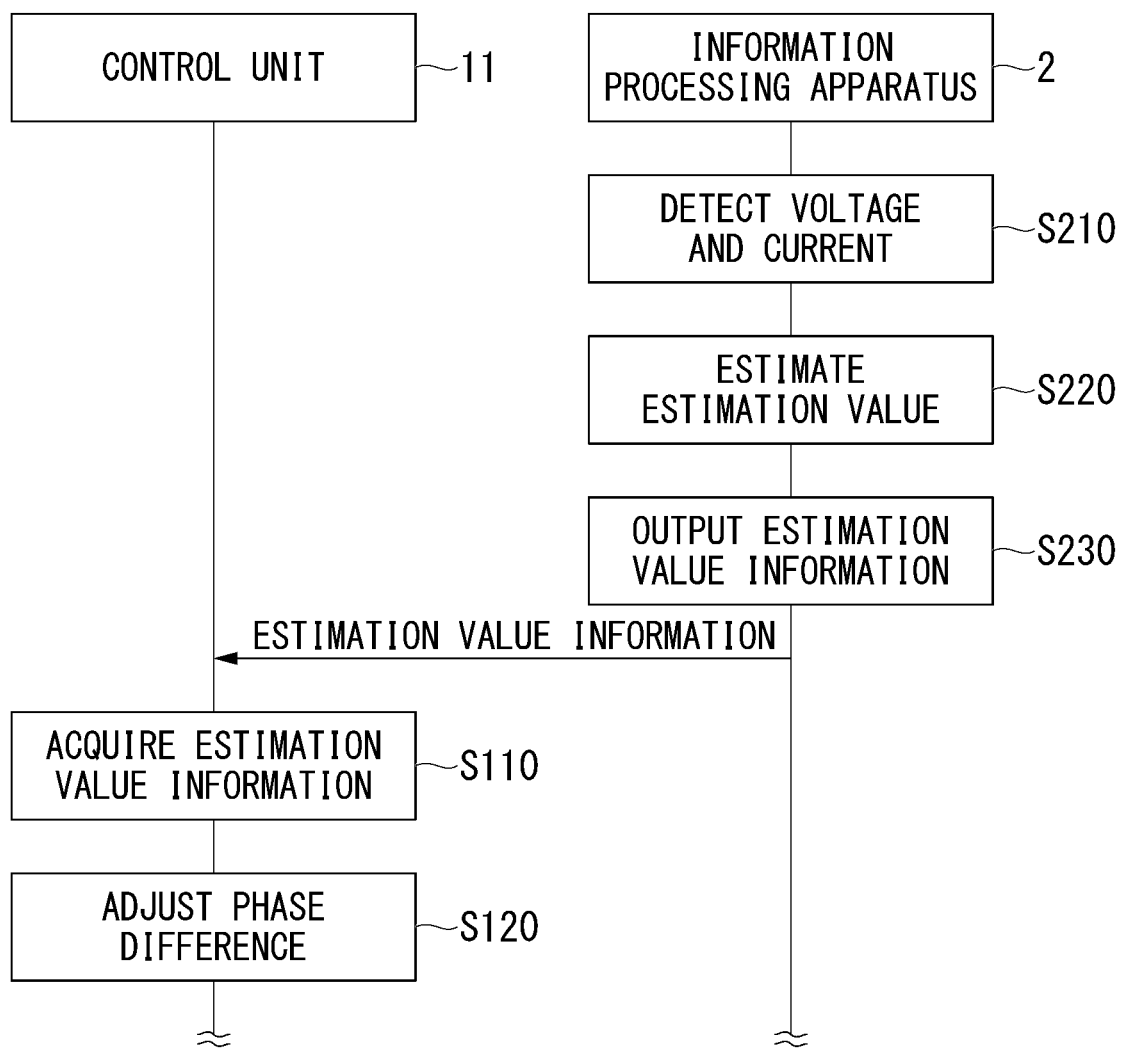
FIG. 5 is a diagram illustrating an example of the flow of a process of adjusting a phase difference using the control unit 11.

Hereinafter, the process of estimating an estimation value using the information processing apparatus 2 and the process of adjusting a phase difference using the control unit 11 will be described with reference to FIG. 5. FIG. 5 is a sequence diagram illustrating an example of the flow of the process of estimating an estimation value using the information processing apparatus 2 and the process of adjusting a phase difference using the control unit 11. Hereinafter, as one example, a case in which an operation for changing an operation mode of the DAB converter 1 to an adjustment mode is accepted by the DAB converter 1 at a timing before the process of Step S210 illustrated in FIG. 5 will be described. Here, the adjustment mode among operation modes of the DAB converter 1 is a mode in which a phase difference is adjusted based on acquired estimation value information in a case in which the estimation value information is acquired from the information processing apparatus 2. The DAB converter 1 may perform the operation through a hardware key included in the DAB converter 1 or through the information processing apparatus 2 or the like connected to the DAB converter 1. Hereinafter, as one example, a case in which an operation for changing the operation mode of the information processing apparatus 2 to the adjustment mode is accepted by the information processing apparatus 2 at this timing will be described. Here, the adjustment mode among the operation modes of the information processing apparatus 2 is a mode in which the information processing apparatus 2 estimates an estimation value, outputs estimation value information representing the estimated estimation value to the DAB converter 1, and causes the DAB converter 1 to adjust a phase difference. The information processing apparatus 2 may perform this operation through a hardware key included in the information processing apparatus 2 or a software key displayed on a display unit (for example, a display) of the information processing apparatus 2.

The information processing apparatus 2 detects voltages and a current (Step S210). More specifically, for example, by acquiring first voltage information from the first voltage detecting unit DV1, the information processing apparatus 2 detects a first voltage represented by the acquired first voltage information in Step S210. In addition, in Step S210, for example, by acquiring first current information from the first current detecting unit DC1, the information processing apparatus 2 detects a first current represented by the acquired first current information. Furthermore, for example, by acquiring second voltage information from the second voltage detecting unit DV2, the information processing apparatus 2 detects a second voltage represented by the acquired second voltage information in Step S210.

Next, the information processing apparatus 2 estimates an estimation value based on the first voltage, the first current, and the second voltage detected in Step S210 (Step S220). An example of the method of estimating an estimation value in Step S220 has already been described, and thus, description thereof will be omitted.

Next, the information processing apparatus 2 generates estimation value information representing an estimation value estimated in Step S220 and outputs the generated estimation value information to the DAB converter 1 (Step S230).

Next, the control unit 11 acquires the estimation value information output from the information processing apparatus 2 from the information processing apparatus 2 (Step S110).

Next, the control unit 11 adjusts a phase difference (Step S120) based on an estimation value represented by the estimation value information acquired in Step S110. For example, a plurality of phase difference information are stored in the DAB converter 1 in advance. Here, the phase difference information is information that includes information for adjusting one or both of switching of the first full bridge circuit B1 and switching of the second full bridge circuit B2. Ranges of the estimation value not overlapping each other are respectively associated with the plurality of phase difference information. Here, for example, in a case in which an estimation value represented by the estimation value information acquired in Step S110 is included in a range X2 associated with certain phase difference information X1 among the plurality of phase difference information stored in the DAB converter 1 in advance, the control unit 11 identifies the phase difference information X1 as phase difference information corresponding to the estimation value. The control unit 11 adjusts the phase difference based on the identified phase difference information X1. More specifically, the control unit 11 changes the current phase difference to a phase difference represented by the identified phase difference information X1. In this way, the control unit 11 adjusts the phase difference. The method of adjusting a phase difference using the control unit 11, as described above, may be another method that is known or a method to be developed from now in place of this. In addition, the control unit 11 may be configured to calculate or generate phase difference information that corresponds to the estimation value based on the estimation value estimated in Step S120.

After the process of Step S120 is performed, the control unit 11 changes the operation mode of the DAB converter 1 from the adjustment mode to a normal operation mode and ends the process.

In this way, the DAB converter 1 adjusts the phase difference based on the estimation value estimated by the information processing apparatus 2. In this way, the DAB converter 1 can inhibit a decrease in the transmission efficiency of electric power due to an individual difference of inductance.

Modified Example of Embodiment

Figure 6:
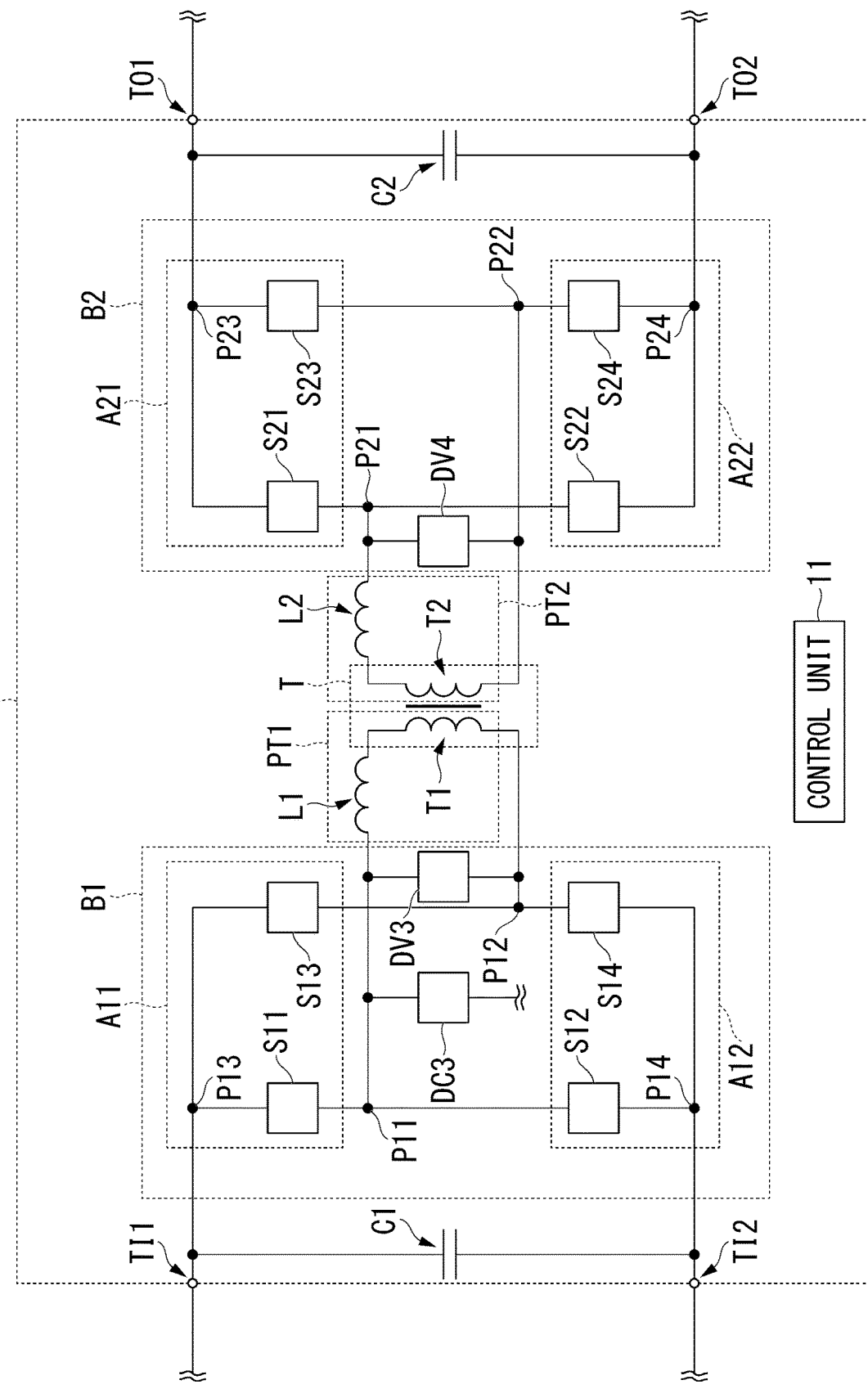
FIG. 6 is a diagram illustrating an example of the configuration of a DAB converter 1 according to a modified example of the embodiment.

Hereinafter, a modified example of the embodiment will be described. In the modified example of the embodiment, the same reference signs will be assigned to components similar to those according to the embodiment, and description thereof will be omitted. In the modified example of the embodiment, a control unit 11 estimates an estimation value instead of being configured to acquire estimation value information from an information processing apparatus 2. In addition, the control unit 11 performs estimation of the estimation value using a method different from that according to the embodiment. In the modified example of the embodiment, as illustrated in FIG. 6, a DAB converter 1 includes a third voltage detecting unit DV3 in place of the first voltage detecting unit DV1. In the modified example of the embodiment, as illustrated in FIG. 6, the DAB converter 1 includes a third current detecting unit DC3 in place of the first current detecting unit DC1. In the modified example of the embodiment, as illustrated in FIG. 6, the DAB converter 1 includes a fourth voltage detecting unit DV4 in place of the second voltage detecting unit DV2. In addition, the DAB converter 1 may be configured not to include the third voltage detecting unit DV3, the third current detecting unit DC3, and the fourth voltage detecting unit DV4. In such a case, the third voltage detecting unit DV3, the third current detecting unit DC3, and the fourth voltage detecting unit DV4 are connected to the DAB converter 1 from the outside. Furthermore, the DAB converter 1 may be configured to include the third voltage detecting unit DV3, the third current detecting unit DC3, and the fourth voltage detecting unit DV4 and have a first voltage detecting unit DV1, a first current detecting unit DC1, a second voltage detecting unit DV2, and a second current detecting unit DC2 mounted therein. In such a case, the control unit 11 may estimate an estimation value in accordance with the method described in the embodiment in addition to the estimation of an estimation value according to the method described in the modified example of the embodiment. In addition, similar to the DAB converter 1 according to the embodiment, the DAB converter 1 according to the modified example of the embodiment may have a configuration in which the information processing apparatus 2 is connected thereto, and the information processing apparatus 2 estimates an estimation value in accordance with the estimation method described in the modified example of the embodiment. In such a case, similar to the embodiment, the information processing apparatus 2 outputs estimation value information representing the estimated estimation value to the control unit 11.

FIG. 6 is a diagram illustrating an example of the configuration of the DAB converter 1 according to the modified example of the embodiment. The DAB converter 1 includes a transformer T, a first full bridge circuit B1, a first inductor L1, a first capacitor C1, a second full bridge circuit B2, a second inductor L2, a second capacitor C2, two input/output terminals TI, two input/output terminals TO, the control unit 11, a third voltage detecting unit DV3, a third current detecting unit DC3, and a fourth voltage detecting unit DV4. In FIG. 6, in order to prevent complications of the drawing, transmission lines connecting the control unit 11 and the other circuits are not drawn in the DAB converter 1.

In the example illustrated in FIG. 6, no load LD is connected to the DAB converter 1. In this example, two DC power supplies that are not illustrated are connected to the DAB converter 1. More specifically, in this example, a first DC power supply that is not illustrated is connected to an input/output terminal TI1 and an input/output terminal TI2 of the DAB converter 1. In addition, in this example, a second DC power supply that is not illustrated is connected to an input/output terminal TO1 and an input/output terminal TO2 of the DAB converter 1.

The third voltage detecting unit DV3 is a voltage detecting circuit. The third voltage detecting unit DV3 is connected between a midpoint P11 and a midpoint P12. In accordance with this, the third voltage detecting unit DV3 can detect a voltage applied to both ends of a first part PT1 as a third voltage. In addition, the third voltage detecting unit DV3 is connected to the control unit 11 through a transmission line that is not illustrated. In other words, the control unit 11 detects a third voltage through the third voltage detecting unit DV3. In addition, the third voltage detecting unit DV3 may be configured to be connected between an input/output terminal P13 and an input/output terminal P14 and detect a voltage applied between the input/output terminal P13 and the input/output terminal P14 as a third voltage. In such a case, similar to the first voltage detecting unit DV1, the third voltage detecting unit DV3 may be configured to be mounted in the DAB converter 1 from the outside.

The third current detecting unit DC3 is a current detecting circuit. The third current detecting unit DC3 is connected between the midpoint P11 and the first part PT1. In accordance with this, the third current detecting unit DC3 can detect a current flowing through the first part PT1 as a third current. In addition, the third current detecting unit DC3 is connected to the control unit 11 through a transmission line that is not illustrated. In other words, the control unit 11 detects a third current through the third current detecting unit DC3.

The fourth voltage detecting unit DV4 is a voltage detecting circuit. The fourth voltage detecting unit DV4 is connected between a midpoint P21 and a midpoint P22. In accordance with this, the fourth voltage detecting unit DV4 can detect a voltage applied to both ends of a second part PT2 as a fourth voltage. In addition, the fourth voltage detecting unit DV4 is connected to the control unit 11 through a transmission line that is not illustrated. In other words, the control unit 11 detects a fourth voltage through the fourth voltage detecting unit DV4. In addition, the fourth voltage detecting unit DV4 may be configured to be connected between an input/output terminal P23 and an input/output terminal P24 and detect a voltage applied between the input/output terminal P23 and the input/output terminal P24 as a fourth voltage. In such a case, similar to the second voltage detecting unit DV2, the fourth voltage detecting unit DV4 may be configured to be mounted in the DAB converter 1 from the outside.

Figure 7:
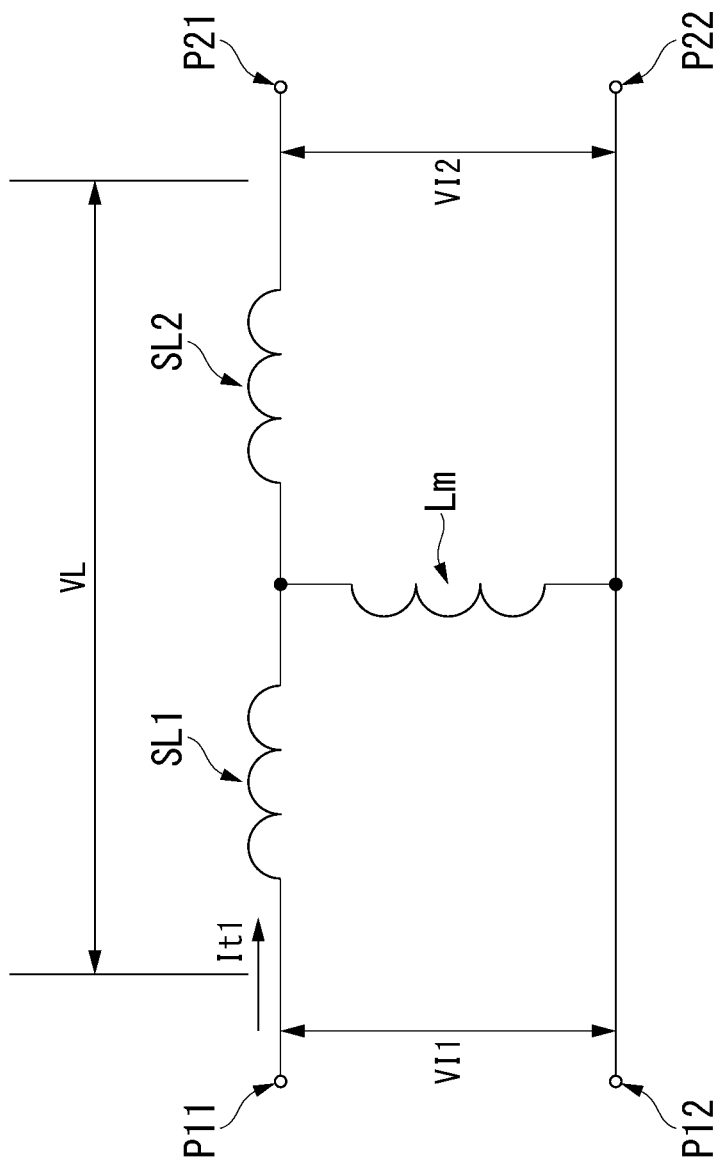
FIG. 7 is an equivalent circuit of a part including a first part PT1 and a second part PT2 in a part of the DAB converter 1 illustrated in FIG. 6.

Here, FIG. 7 is an equivalent circuit of a part, which includes the first part PT1 and the second part PT2, of the DAB converter 1 illustrated in FIG. 6. An inductance SL1 illustrated in FIG. 7 represents an example of the inductance of the first part PT1 in the equivalent circuit illustrated in FIG. 7. In addition, an inductance SL2 illustrated in FIG. 7 represents an example of the inductance of the second part PT2 of the equivalent circuit illustrated in FIG. 7. An inductance Lm illustrated in FIG. 7 represents an example of a mutual inductance of a transformer T in the equivalent circuit illustrated in FIG. 7. A voltage VL illustrated in FIG. 7 represents an example of a voltage applied between a midpoint P11 and a midpoint P21 in the equivalent circuit illustrated in FIG. 7. A voltage VI1 illustrated in FIG. 7 represents an example of a voltage applied between the midpoint P11 and a midpoint P12 in the equivalent circuit illustrated in FIG. 7. A voltage VI2 illustrated in FIG. 7 represents an example of a voltage applied between a midpoint P21 and a midpoint P22 in the equivalent circuit illustrated in FIG. 7. A current It1 illustrated in FIG. 7 illustrates an example of a current flowing from the midpoint P11 to the midpoint P21 in the equivalent circuit illustrated in FIG. 7.

Here, when the magnitude of a voltage applied between two input/output terminals T1 included in the DAB converter 1 from a first DC power supply is denoted by v1, the magnitude of a voltage applied between the two input/output terminals TI included in the DAB converter 1 from a first DC power supply is denoted by v2, a combined inductance of the inductance of the first inductor L1 and the leakage inductance of the primary-side winding T1 is denoted by l1, and a combined inductance of the inductance of the second inductor L2 and the leakage inductance of the secondary-side winding T2 is denoted by l2, the inductance SL1, the inductance SL2, the voltage VI1, and the voltage VI2 can be respectively represented as in the following Equations (3) to (6).

$$SL1 = l1 \qquad (3)$$

$$SL2 = l2 \times (N2/N1)^2 \qquad (4)$$

$$VI1 = v1 \qquad (5)$$

$$VI2 = v2 \times (N2/N1) \qquad (6)$$

In accordance with such situations, by supplying voltages from the first DC power supply and the second DC power supply to the DAB converter 1, the control unit 11 can estimate an estimation value using a method described below.

Figure 8:
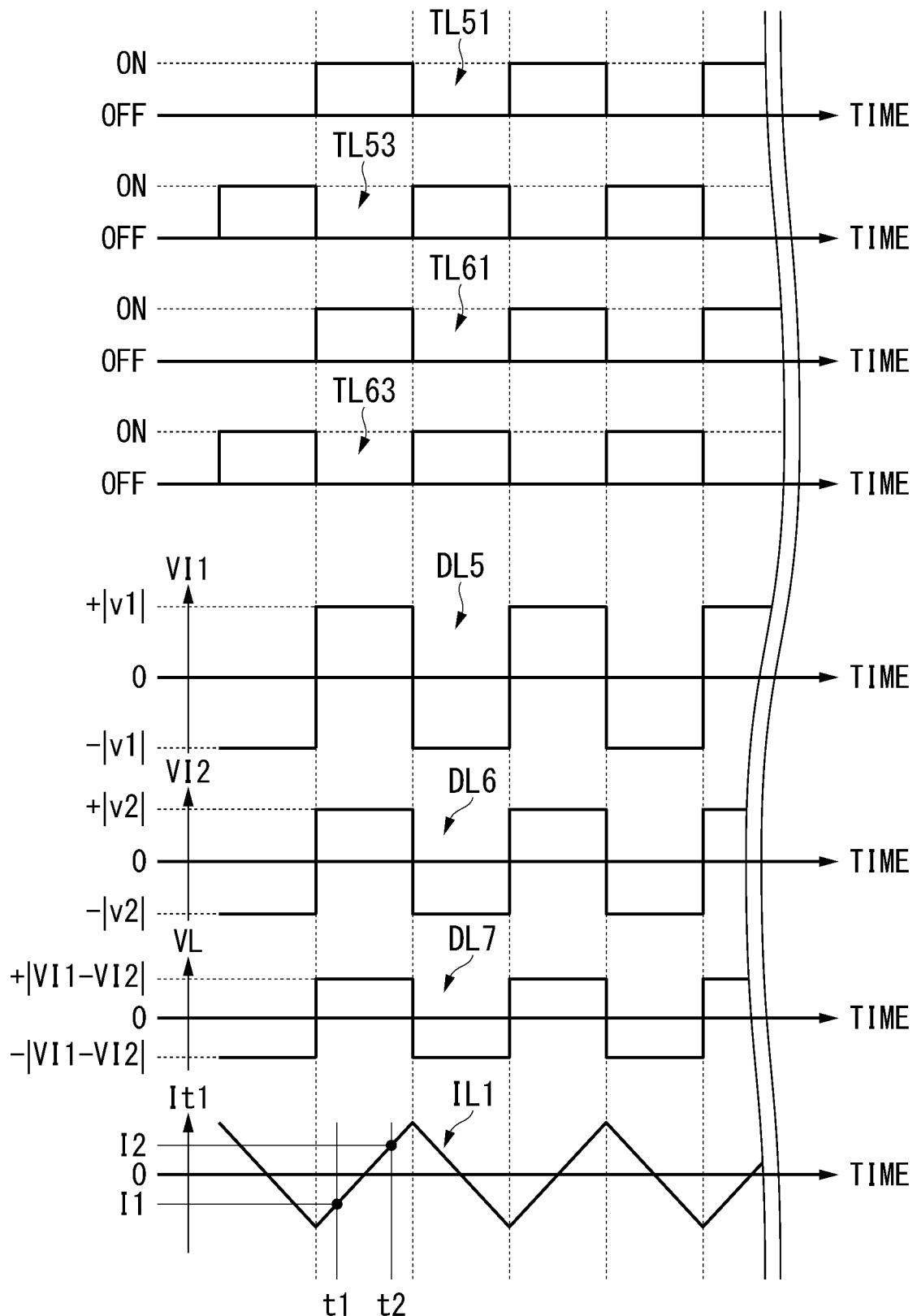
FIG. 8 is a diagram illustrating a process performed by the control unit 11 in a case in which an estimation value is estimated in the modified example of the embodiment.

Here, FIG. 8 is a diagram illustrating a process performed by the control unit 11 in a case in which an estimation value is estimated in the modified example of the embodiment.

In a case in which an estimation value is estimated in the modified example of the embodiment, as illustrated by a graph TL51 represented in FIG. 8, the control unit 11 repeatedly changes the state of the switching element S11 between the on state and the off state. The graph TL51 illustrated in FIG. 8 is a diagram that represents an example of changes of the state of the switching element S11 over time in that case. In the graph TL51, a period in which the state of the switching element S11 is the on state is represented by a period in which a displacement of a square wave represented in the graph TL51 coincides with "ON". In addition, in the graph TL51, a period in which the state of the switching element S11 is the off state is represented by a period in which a displacement of the square wave represented in the graph TL51 coincides with "OFF". A square wave representing changes of the state of the switching element S12 over time is a square wave of which a phase is shifted by 2π from that of the square wave representing changes of the state of the switching element 811 over time, and thus, illustration thereof is omitted.

In addition, in a case in which an estimation value is estimated in the modified example of the embodiment, as represented by a graph TL53 illustrated in FIG. 8, the control unit 11 repeatedly changes the state of the switching element S13 between the on state and the off state. The graph TL53 illustrated in FIG. 8 is a diagram that represents an example of changes of the state of the switching element S13 over time in that case. In the graph TL53, a period in which the state of the switching element S13 is the on state is represented by a period in which a displacement of a square wave represented in the graph TL53 coincides with "ON". In addition, in the graph TL53, a period in which the state of the switching element S13 is the off state is represented by a period in which a displacement of the square wave represented in the graph TL53 coincides with "OFF". A square wave representing changes of the state of the switching element S14 over time is a square wave of which a phase is shifted by 2π from that of the square wave representing changes of the state of the switching element S13 over time, and thus, illustration thereof is omitted.

In a case in which an estimation value is estimated in the modified example of the embodiment, as illustrated by a graph TL61 represented in FIG. 8, the control unit 11 repeatedly changes the state of the switching element S21 between the on state and the off state. The graph TL61 illustrated in FIG. 8 is a diagram that represents an example of changes of the state of the switching element S21 over time in that case. In the graph TL61, a period in which the state of the switching element S21 is the on state is represented by a period in which a displacement of a square wave represented in the graph TL61 coincides with "ON". In addition, in the graph TL61, a period in which the state of the switching element S21 is the off state is represented by a period in which a displacement of the square wave represented in the graph TL61 coincides with "OFF". A square wave representing changes of the state of the switching element S22 over time is a square wave of which a phase is shifted by 2π from that of the square wave representing changes of the state of the switching element S21 over time, and thus, illustration thereof is omitted.

In addition, in a case in which an estimation value is estimated in the modified example of the embodiment, as represented by a graph TL63 illustrated in FIG. 8, the control unit 11 repeatedly changes the state of the switching element S23 between the on state and the off state. The graph TL63 illustrated in FIG. 8 is a diagram that represents an example of changes of the state of the switching element S23 over time in that case. In the graph TL63, a period in which the state of the switching element S23 is the on state is represented by a period in which a displacement of a square wave represented in the graph TL63 coincides with "ON". In addition, in the graph TL63, a period in which the state of the switching element S23 is the off state is represented by a period in which a displacement of the square wave represented in the graph TL63 coincides with "OFF". A square wave representing changes of the state of the switching element S24 over time is a square wave of which a phase is shifted by 2π from that of the square wave representing changes of the state of the switching element S23 over time, and thus, illustration thereof is omitted.

In a case in which the switching elements S11 to S14 and the switching elements S21 to S24 are switched as illustrated in FIG. 8, the voltage VI1 described above changes over time as represented by a graph DL5 illustrated in FIG. 8.

In addition, in a case in which the switching elements S11 to S14 and the switching elements S21 to S24 are switched as illustrated in FIG. 8, the voltage VI2 described above changes over time as represented by a graph DL6 illustrated in FIG. 8.

In accordance with these, in a case in which the switching elements S11 to S14 and the switching elements S21 to S24 are switched as illustrated in FIG. 8, the voltage VL changes over time as represented by a graph DL7 illustrated in FIG. 8. As illustrated in FIG. 8, VL is determined in accordance with a difference between VI1 and VI2, that is, a difference between the third voltage and the fourth voltage.

Here, as represented in the graphs DL5 to DL7, changes of each of the voltages VI1, VI2, and VL over time is represented as a square wave synchronized with the switching of the switching elements S11 to S14 and the switching elements S21 to S24.

Meanwhile, in a case in which the switching elements S11 to S14 and the switching elements S21 to S24 are switched as illustrated in FIG. 8, a current It1 changes over time as represented by a graph IL1 illustrated in FIG. 8. As represented by the graph IL1, changes of the current It1 over time periodically repeat an increase with a constant slope and a decrease with a constant slope sequentially in that case. Here, a time t1 and a time t2 are two different times within one certain period among a plurality of periods in which the current It1 increases with the constant slope. The time t2 is a time after the time t1. Hereinafter, for the convenience of description, a current value of the current It1 at the time t1 will be denoted by i1, and a current value of the current It1 at the time t2 will be denoted by i2 in description.

Here, the control unit 11 can estimate an estimation value based on the following Equation (7) together with the voltage VL, the current value i1, the current value i2, the time t1, and the time t2.

$$Lp = VL(t2-t1)/(i2-i1) \qquad (7)$$

Lp represented above in Equation (7) represents an estimation value seen from the first full bridge circuit B1. The deriving of Equation (7) described above can be calculated immediately based on electromagnetics. For this reason, description of the method for deriving Equation (7) will be omitted.

In other words, the control unit 11 can estimate an estimation value seen from the first full bridge circuit B1 based on a difference between the third voltage and the fourth voltage, the third current, and Equation (7) described above.

Figure 9:
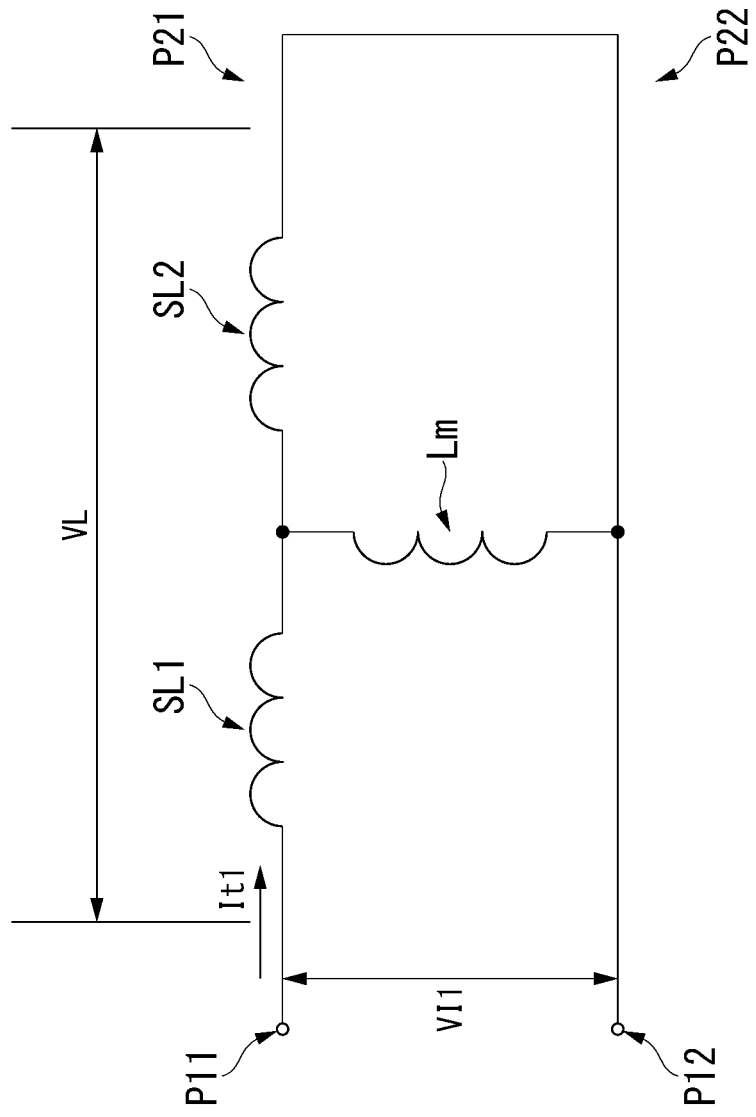
FIG. 9 is an equivalent circuit of a part, which includes the first part PT1 and the second part PT2, of the DAB converter 1 in a case in which a secondary-side circuit is short circuited.

Here, even when the secondary-side circuit of the DAB converter 1 is short-circuited, in other words, even when the second full bridge circuit B2 is short-circuited, the control unit 11 can estimate the estimation value seen from the first full bridge circuit B1 based on a difference between the third voltage and the fourth voltage, the third current, and Equation (7) described above. For example, by setting the states of both the switching element S21 and the switching element S23 to the on state or by setting the states of both the switching element S22 and the switching element S24 to the on state, the control unit 11 can cause the secondary-side circuit of the DAB converter 1 to be short circuited. In such a case, the equivalent circuit illustrated in FIG. 7 changes to an equivalent circuit illustrated in FIG. 9. FIG. 9 is an equivalent circuit of a part, which includes the first part PT1 and the second part PT2, of the DAB converter 1 in a case in which the secondary-side circuit is short circuited. Even in this case, the control unit 11 can estimate an estimation value seen from the first full bridge circuit B1 based on a difference between the third voltage and the fourth voltage, the third current, and Equation (7) described above. In addition, in this case, generation of an excitation current in the transformer T can be inhibited, and thus the inductance (in other words, an estimation value) can be estimated with higher accuracy. As a result, the DAB converter 1 can more reliably inhibit a decrease in the transmission efficiency of electric power due to an individual difference of the inductance.

In addition, the DAB converter 1 may be configured to include a fourth current detecting unit DC4 in place of the third current detecting unit DC3 or in addition to the third current detecting unit DC3.

The fourth current detecting unit DC4 is a current detecting circuit. The fourth current detecting unit DC4 is connected between the midpoint P21 and the second part PT2. In accordance with this, the fourth current detecting unit DC4 can detect a current flowing through the second part PT2 as a fourth current. In addition, the fourth current detecting unit DC4 is connected to the control unit 11 through a transmission line that is not illustrated. In other words, the control unit 11 detects a fourth current through the fourth current detecting unit DC4.

In a case in which the DAB converter 1 includes the fourth current detecting unit DC4, the control unit 11 can estimate an estimation value seen from the second full bridge circuit B2 instead of the estimation value seen from the first full bridge circuit B1. Also in such a case, the DAB converter 1 can inhibit a decrease in the transmission efficiency of electric power due to an individual difference of the inductance. In such a case, details of an equation used by the control unit 11 for estimation instead of Equation (7) can be easily derived from electromagnetics, and thus description thereof will be omitted.

In addition, the method for estimating an estimation value and the method for adjusting a phase difference based on the estimated estimation value described above may be applied to other electronic apparatuses instead of the DAB converter.

As described above, a DAB converter according to the embodiment (in the example described above, the DAB converter 1) is a DAB converter including: a transformer (in the example described above, the transformer T) having a primary-side winding (in the example described above, the primary-side winding T1) and a secondary-side winding (in the example described above, the secondary-side winding T2); a first full bridge circuit (in the example described above, the first full bridge circuit B1); a second full bridge circuit (in the example described above, the second full bridge circuit B2); a first capacitor (in the example described above, the first capacitor C1); a second capacitor (in the example described above, the second capacitor C2); and a control unit (in the example described above, the control unit 11) configured to control switching of the first full bridge circuit and switching of the second full bridge circuit, in which, the primary-side winding is connected between a 11th midpoint (in the example described above, the midpoint P11) among two midpoints included in the first full bridge circuit and a 12th midpoint (in the example described above, the midpoint P12) among the two midpoints included in the first full bridge circuit, the secondary-side winding is connected between a 21st midpoint (in the example described above, the midpoint P21) among two midpoints included in the second full bridge circuit and a 22nd midpoint (in the example described above, the midpoint P22) among the two midpoints included in the second full bridge circuit, the first capacitor is connected between two input/output terminals (in the example described above, the input/output terminal P13 and the input/output terminal P14) included in the first full bridge circuit, the second capacitor is connected between two input/output terminals (in the example described above, the input/output terminal P23 and the input/output terminal P24) included in the second full bridge circuit, and the control unit configured to adjust a phase difference between the switching of the first full bridge circuit and the switching of the second full bridge circuit based on an estimated value of an inductance of the DAB converter. In accordance with this, the DAB converter can inhibit a decrease in the transmission efficiency of electric power due to an individual difference of the inductance.

In addition, in the DAB converter, a configuration in which the inductance of the DAB converter is a combined inductance of a leakage inductance of the primary-side winding and a leakage inductance of the secondary-side winding may be used.

Furthermore, in the DAB converter, a configuration in which a first inductor (in the example described above, the first inductor L1) is further included, and the primary-side winding and the first inductor are connected in series between the 11th midpoint and the 12th midpoint, and the inductance of the DAB converter is a combined inductance of a leakage inductance of the primary-side winding, a leakage inductance of the secondary-side winding, and an inductance of the first inductor may be used.

In addition, in the DAB converter, a configuration in which a second inductor (in the example illustrated above, the second inductor L2) is further included, the secondary-side winding and the second inductor are connected in series between the 21st midpoint and the 22nd midpoint, and the inductance of the DAB converter is a combined inductance of a leakage inductance of the primary-side winding, a leakage inductance of the secondary-side winding, and an inductance of the second inductor may be used.

Furthermore, in the DAB converter, a configuration in which a first inductor and second inductor are further included, the primary-side winding and the first inductor are connected in series between the 11th midpoint and the 12th midpoint, the secondary-side winding and the second inductor are connected in series between the 21st midpoint and the 22nd midpoint, and the inductance of the DAB converter is a combined inductance of a leakage inductance of the primary-side winding, a leakage inductance of the secondary-side winding, an inductance of the first inductor, and an inductance of the second inductor may be used.

In addition, in the DAB converter, a configuration in which the estimated value is a value that is estimated based on a first voltage applied between the two input/output terminals included in the first full bridge circuit, a first current flowing through one of the two input/output terminals included in the first full bridge circuit, and a second voltage applied between the two input/output terminals included in the second full bridge circuit may be used.

Furthermore, in the DAB converter, a configuration in which the estimated value is a value that is estimated based on a first voltage applied between the two input/output terminals included in the first full bridge circuit, a second voltage applied between the two input/output terminals included in the second full bridge circuit, and a second current flowing through one of the two input/output terminals included in the second full bridge circuit may be used.

In addition, in the DAB converter, a configuration in which the estimated value is a value that is estimated based on a third voltage applied to both ends of a first part (in the example described above, the first part P1) including the primary-side winding, a third current flowing through the first part, and a fourth voltage applied to both ends of a second part (in the example described above, the second part PT2) including the secondary-side winding may be used.

Furthermore, in the DAB converter, a configuration in which the estimated value is a value that is estimated based on a third voltage applied to both ends of a first part including the primary-side winding, a fourth voltage applied to both ends of a second part including the secondary-side winding, and a fourth current flowing through the second part may be used.

In addition, in the DAB converter, a configuration in which the estimated value is a value that is estimated based on a third voltage applied to both ends of a first part including the first inductor and the primary-side winding, a third current flowing through the first inductor, and a fourth voltage applied to both ends of a second part including the secondary-side winding may be used.

Furthermore, in the DAB converter, a configuration in which the estimated value is the estimated value seen from the first full bridge circuit and is a value estimated based on a difference between the third voltage and the fourth voltage and the third current may be used.

In addition, in the DAB converter, a configuration in which the estimated value is a value that is estimated based on the third voltage applied to both ends of a first part including the primary-side winding, the fourth voltage applied to both ends of a second part including the second inductor and the secondary-side winding, and a fourth current flowing through the second part may be used.

Furthermore, in the DAB converter, a configuration in which the estimated value is the estimated value seen from the second full bridge circuit and is a value estimated based on a difference between the third voltage and the fourth voltage and the fourth current may be used.

In addition, in the DAB converter, a configuration in which the control unit acquires the estimated value and adjusts the phase difference based on the acquired estimated value may be used.

Furthermore, in the DAB converter, a configuration in which the control unit acquires the estimated value and adjusts the phase difference based on the acquired estimated value may be used.

In addition, in the DAB converter, a configuration in which the control unit adjusts the phase difference by adjusting one or both of the switching of the first full bridge circuit and the switching of the second full bridge circuit may be used.

Furthermore, in the DAB converter, a configuration in which the control unit identifies phase difference information representing the phase difference corresponding to the estimated value and adjusts the phase difference based on the identified phase difference information, and information for adjusting one or both of the switching of the first full bridge circuit and the switching of the second full bridge circuit is included in the phase difference information may be used.

While the embodiment of the present invention has been described in detail with reference to the drawings, a specific configuration is not limited to this embodiment, and modifications, substitutions, omissions, and the like may be performed as long as it does not depart from the concept of the present invention.

EXPLANATION OF REFERENCES

1 DAB converter
11 control unit
A11, A21 upper arm
A12, A22 lower arm
B1 first full bridge circuit
B2 second full bridge circuit
C1 first capacitor
C2 second capacitor
DC1 first current detecting unit
DC2 second current detecting unit
DC3 third current detecting unit
DC4 fourth current detecting unit
DV1 first voltage detecting unit
DV2 second voltage detecting unit
DV3 third voltage detecting unit
DV4 fourth voltage detecting unit
L1 first inductor
L2 second inductor
LD load
P1 first part
P11, P12, P21, P22 midpoint
P13, P14, P23, P24, TI, TI1, TI2, TO, TO1, TO2 input/output terminal
PT1 first part
PT2 second part
S1, S2, S11, S12, S13, S14, S21, S22, S23, S24 switching element
T transformer
T1 primary-side winding
T2 secondary-side winding

What is claimed is:
1. A DAB (dual active bridge) converter comprising:
a transformer having a primary-side winding and a secondary-side winding;

a first full bridge circuit;
a second full bridge circuit;
a first capacitor;
a second capacitor; and
a control unit configured to control switching of the first full bridge circuit and switching of the second full bridge circuit,
wherein the primary-side winding is connected between a 11th midpoint among two midpoints included in the first full bridge circuit and a 12th midpoint among the two midpoints included in the first full bridge circuit,
wherein the secondary-side winding is connected between a 21st midpoint among two midpoints included in the second full bridge circuit and a 22nd midpoint among the two midpoints included in the second full bridge circuit,
wherein the first capacitor is connected between two input/output terminals included in the first full bridge circuit,
wherein the second capacitor is connected between two input/output terminals included in the second full bridge circuit, and
wherein the control unit configured to adjust a phase difference between the switching of the first full bridge circuit and the switching of the second full bridge circuit based on an estimated value of an inductance of the DAB converter.

2. The DAB converter according to claim 1, wherein the inductance of the DAB converter is a combined inductance of a leakage inductance of the primary-side winding and a leakage inductance of the secondary-side winding.

3. The DAB converter according to claim 2, wherein the estimated value is a value that is estimated based on a third voltage applied to both ends of a first part including the primary-side winding, a third current flowing through the first part, and a fourth voltage applied to both ends of a second part including the secondary-side winding.

4. The DAB converter according to claim 3, wherein the estimated value is a value that is estimated based on the third voltage applied to both ends of a first part including the primary-side winding, the fourth voltage applied to both ends of a second part including the secondary-side winding, and a fourth current flowing through the second part.

5. The DAB converter according to claim 2, wherein the estimated value is a value that is estimated based on a third voltage applied to both ends of a first part including the primary-side winding, a fourth voltage applied to both ends of a second part including the secondary-side winding, and a fourth current flowing through the second part.

6. The DAB converter according to claim 1, further comprising a first inductor,
wherein the primary-side winding and the first inductor are connected in series between the 11th midpoint and the 12th midpoint, and
wherein the inductance of the DAB converter is a combined inductance of a leakage inductance of the primary-side winding, a leakage inductance of the secondary-side winding, and an inductance of the first inductor.

7. The DAB converter according to claim 6, wherein the estimated value is a value that is estimated based on a third voltage applied to both ends of a first part including the first inductor and the primary-side winding, a third current flowing through the first inductor, and a fourth voltage applied to both ends of a second part including the secondary-side winding.

8. The DAB converter according to claim 7, wherein the estimated value is the estimated value seen from the first full bridge circuit and is a value estimated based on a difference between the third voltage and the fourth voltage and the third current.

9. The DAB converter according to claim 1, further comprising a second inductor,
wherein the secondary-side winding and the second inductor are connected in series between the 21st midpoint and the 22nd midpoint, and
wherein the inductance of the DAB converter is a combined inductance of a leakage inductance of the primary-side winding, a leakage inductance of the secondary-side winding, and an inductance of the second inductor.

10. The DAB converter according to claim 9, wherein the estimated value is a value that is estimated based on a third voltage applied to both ends of a first part including the primary-side winding, a fourth voltage applied to both ends of a second part including the second inductor and the secondary-side winding, and a fourth current flowing through the second part.

11. The DAB converter according to claim 10, wherein the estimated value is the estimated value seen from the second full bridge circuit and is a value estimated based on a difference between the third voltage and the fourth voltage and the fourth current.

12. The DAB converter according to claim 1, further comprising:
a first inductor; and
a second inductor,
wherein the primary-side winding and the first inductor are connected in series between the 11th midpoint and the 12th midpoint,
wherein the secondary-side winding and the second inductor are connected in series between the 21st midpoint and the 22nd midpoint, and
wherein the inductance of the DAB converter is a combined inductance of a leakage inductance of the primary-side winding, a leakage inductance of the secondary-side winding, an inductance of the first inductor, and an inductance of the second inductor.

13. The DAB converter according to claim 12, wherein the estimated value is a value that is estimated based on a third voltage applied to both ends of a first part including the first inductor and the primary-side winding, a third current flowing through the first inductor, and a fourth voltage applied to both ends of a second part including the secondary-side winding.

14. The DAB converter according to claim 13, wherein the estimated value is the estimated value seen from the first full bridge circuit and is a value estimated based on a difference between the third voltage and the fourth voltage and the third current.

15. The DAB converter according to claim 12, wherein the estimated value is a value that is estimated based on a third voltage applied to both ends of a first part including the primary-side winding, a fourth voltage applied to both ends of a second part including the second inductor and the secondary-side winding, and a fourth current flowing through the second part.

16. The DAB converter according to claim 1, wherein the estimated value is a value that is estimated based on a first voltage applied between the two input/output terminals included in the first full bridge circuit, a first current flowing through one of the two input/output terminals included in the first full bridge circuit, and a second voltage applied between the two input/output terminals included in the second full bridge circuit.

17. The DAB converter according to claim 1, wherein the estimated value is a value that is estimated based on a first voltage applied between the two input/output terminals included in the first full bridge circuit, a second voltage applied between the two input/output terminals included in the second full bridge circuit, and a second current flowing through one of the two input/output terminals included in the second full bridge circuit.

18. The DAB converter according to claim 1, wherein the control unit acquires the estimated value and adjusts the phase difference based on the acquired estimated value.

19. The DAB converter according to claim 1, wherein the control unit estimates the estimated value and adjusts the phase difference based on the estimated value that has been estimated.

20. The DAB converter according to claim 1, wherein the control unit adjusts the phase difference by adjusting one or both of the switching of the first full bridge circuit and the switching of the second full bridge circuit.

21. The DAB converter according to claim 1,
wherein the control unit identifies phase difference information representing the phase difference corresponding to the estimated value and adjusts the phase difference based on the identified phase difference information, and
wherein information for adjusting one or both of the switching of the first full bridge circuit and the switching of the second full bridge circuit is included in the phase difference information.

* * * * *